US008588466B2

(12) United States Patent
Ikeda

(10) Patent No.: US 8,588,466 B2
(45) Date of Patent: Nov. 19, 2013

(54) OBJECT AREA DETECTION SYSTEM, DEVICE, METHOD, AND PROGRAM FOR DETECTING AN OBJECT

(75) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 708 days.

(21) Appl. No.: 12/665,802

(22) PCT Filed: Jul. 4, 2008

(86) PCT No.: PCT/JP2008/062157
§ 371 (c)(1),
(2), (4) Date: Dec. 21, 2009

(87) PCT Pub. No.: WO2009/005141
PCT Pub. Date: Jan. 8, 2009

(65) Prior Publication Data
US 2010/0322475 A1 Dec. 23, 2010

(30) Foreign Application Priority Data
Jul. 5, 2007 (JP) ................................. 2007-177389

(51) Int. Cl.
*G06K 9/00* (2006.01)
(52) U.S. Cl.
USPC ........................................................ 382/103
(58) Field of Classification Search
None
See application file for complete search history.

(56) References Cited

U.S. PATENT DOCUMENTS 6,301,371 B1 * 10/2001 Jones et al. .................... 382/106
6,658,136 B1 * 12/2003 Brumitt ......................... 382/103

FOREIGN PATENT DOCUMENTS

| JP | 6-30417 A | 2/1994 |
| JP | 6-180749 A | 6/1994 |
| JP | 7-262355 A | 10/1995 |
| JP | 8-55220 A | 2/1996 |
| JP | 2000082146 A | 3/2000 |
| JP | 2002157598 A | 5/2002 |
| JP | 2002288658 A | 10/2002 |
| JP | 2005092346 A | 4/2005 |
| JP | 2007164690 A | 6/2007 |

OTHER PUBLICATIONS

International Search Report for PCT/JP2008/062157 mailed Aug. 12, 2008.

* cited by examiner

*Primary Examiner* — Claire X Wang

(57) ABSTRACT

To enable detection of an overlying object distinctively even if a stationary object is overlaid with another stationary object or a moving object. A data processing device includes a first unit which detects an object area in a plurality of time-series continuous input images, a second unit which detects a stationary area in the object area from the plurality of continuous input images, a third unit which stores information of the stationary area as time-series background information, and a fourth unit which compares the time-series background information with the object area to thereby detect each object included in the object area.

26 Claims, 15 Drawing Sheets

FIG. 4

| PIXEL POSITION (x COORDINATE, y COORDINATE) | STATIONARY OBJECT LAYER ID | LAYER GENERATION TIME | REFERENCE FEATURE VALUE | NUMBER OF FEATURE VALUES | SUM OF FEATURE VALUES | SQUARE SUM OF FEATURE VALUES | AVERAGE VALUE | DISPERSION VALUE |
|---|---|---|---|---|---|---|---|---|
| (0,0) | 1 | 2007/01/25 15:14:00:03 | 52 | 94 | 4794 | 250446 | 51 | 64 |
|  | 2 | 2007/01/25 15:14:30:08 | 79 | 164 | 13776 | 1163052 | 84 | 36 |
| (1,0) | 1 | 2007/01/25 15:14:00:18 | 48 | 96 | 4800 | 244655 | 50 | 49 |
|  | 2 | 2007/01/25 15:14:30:11 | 82 | 168 | 14280 | 1217975 | 85 | 25 |
|  | 3 | 2007/01/25 15:14:52:05 | 119 | 101 | 12423 | 1531629 | 123 | 36 |
| ⋮ | 1 | ⋮ | ⋮ | ⋮ | ⋮ | ⋮ | ⋮ | ⋮ |
|  | ⋮ | ⋮ | ⋮ | ⋮ | ⋮ | ⋮ | ⋮ | ⋮ | though there
OBJECT AREA DETECTION SYSTEM, DEVICE, METHOD, AND PROGRAM FOR DETECTING AN OBJECT This application is the National Phase of PCT/JP2008/062157, filed Jul. 4, 2008, which is based upon and claims the benefit of priority from Japanese patent application No. 2007-177389, filed on Jul. 5, 2007, the disclosure of which is incorporated herein in its entirety by reference.

TECHNICAL FIELD

The present invention relates to an object area detection device and the like, capable of distinctively detecting an object overlying a stationary object based on a moving image.

BACKGROUND ART

This kind of object area detection device and the like are used for distinctively detecting an object overlying a stationary object. Related art thereof will be described below.

A first example of the related art is disclosed in Patent Document 1. A mobile object recognition method disclosed in Patent Document 1 uses a template image of a preregistered target object or a template image of a target object acquired based on an aspect that an appearing position or an appearing time of the object is noted by a method, to thereby follow the object by means of pattern matching. Thereby, even if the object overlies, the overlying object is distinguished by detecting the position of the object.

A second example of the related art is disclosed in Patent Document 2. A road object monitoring device disclosed in Patent Document 2 uses a reference image not including an object as a background image, and generates a background differential image from a difference between the background image and an input image (time t) (background difference method). The device also generates continuous differential images from a difference between an input image at time t and an input image at time (t−1). The device binarizes both differential images, detects a mobile object from their logical AND, and detects a stationary object from exclusive OR, to thereby distinguish an overlying object.

Patent Document 1: Japan Unexamined Patent Publication 6-030417 (FIG. 20, etc)
Patent Document 2: Japan Unexamined Patent Publication 6-180749 (FIG. 1, etc)

DISCLOSURE OF THE INVENTION

Problems to be Solved by the Invention

However, the related art disclosed in Patent Documents 1 and 2 involves the following problems.

In the related art disclosed in Patent Document 1, if a new object appears from a stationary object when a target object is not specified and the new object exists on the stationary object, it is not possible to detect the overlying object by distinguishing the object from the stationary object. This is because as a target object is not specified, a template image of the target object cannot be registered beforehand. Further, as a new object abruptly appears from an object, the appearing position or the appearing time of the new object is not fixed, so that a template image of the target object cannot be acquired. Exemplary situations of this problem include a case where a passenger gets of a temporarily stopping bus and the passenger stays in front of the bus.

In the related art of Patent Document 2, when another stationary object (object B) overlays a stationary object (object A), those stationary objects cannot be detected distinctively. This is because as the overlying stationary object (object B) does not move, the object does not appear in continuous differential images.

Further, in the related art of Patent Document 2, when a single-color object moves in one direction, it may be erroneously detected as if there is an overlying object although there is no overlying object. This is because in continuing input images, only the object overlying portions do not appear in the continuous differential image.

Therefore, an object of the present invention is to provide an object area detection device and the like, capable of distinctively detecting an overlying object even if a new object appears from an object, and also distinctively detecting an overlying object even if another stationary object overlays a stationary object.

Means for Solving the Problems

An object area detection device according to the present invention includes a first unit which detects an object area in a plurality of time-series continuous input images; a second unit which detects a stationary area included in the object area from the plurality of continuous input images; a third unit which accumulates information of the stationary area as time-series background information; and a fourth unit which compares the time-series background information with the object area and detects each object included in the object area.

An object area detection system according to the present invention includes the object area detection device according to the present invention; an image acquisition unit which acquires an input image from a moving image and outputs the input image to the object area detection device; and a storage device which stores information including the feature value and the stationary object layer information.

An object area detection method according to the present invention includes a step "a" of detecting an object area for a plurality of time-series continuous input images; a step "b" of detecting a stationary area included in the object area from the plurality of continuous input images; a step "c" of accumulating information of the stationary area as time-series background information; and a step "d" of comparing the time-series background information with the object area and detecting each object included in the object area.

An object area detection program according to the present invention causes a computer to perform a function of detecting an object area for a plurality of time-series continuous input images; a function of detecting a stationary area included in the object area from the plurality of continuous input images; a function of outputting information of the stationary area as database of time-series background information; and a function of comparing the time-series background information with the object area, and detecting each object included in the object area.

According to the present invention, even if a new object appears from an object, the overlying object can be detected distinctively, and even if another stationary object overlies a stationary object, the overlying object can be detected distinctively.

BEST MODE FOR CARRYING OUT THE INVENTION

Hereinafter, an exemplary embodiment of the invention will be described based on the drawings.

FIG. 1 is a block diagram showing an example of an object area detection device and an object area detection system according to an exemplary embodiment of the invention. FIGS. 2 and 3 are illustrations showing outlines of operation. Hereinafter, description will be given based on these drawings.

An object area detection system 100 according to the present invention includes a data processing device 2 as an object area detection device according to the exemplary embodiment of the invention, an image acquisition unit 1 which acquires input images from a moving image and outputs the images to the data processing device 2, and a storage device 3 which stores information including feature values and stationary object layer information described later. The data processing device 2 can be realized by causing a computer to execute programs, for example. The image acquisition unit 1 may be hardware or software called video capture for example, and acquires input images from a moving picture of a camera, a video, or the like. The storage device 3 is a typical device such as a hard disk, a semiconductor memory, or the like.

Next, outlines of the data processing device 2 of the exemplary embodiment will be described. The data processing device 2 includes a first unit 101 which detects object areas in a plurality of time-series continuous input images, a second unit 102 which detects stationary areas included in the object areas from the continuous input images, a third unit 103 which stores information of the stationary areas as time-series background information, and a fourth unit 104 which compares the time-series background information with the object areas to thereby detect respective objects included in the object areas.

The data processing device 2 operates as follows. First, the first unit 101 detects object areas in a plurality of time-series continuous input images (feature images) acquired by a feature extraction unit 21. As shown in FIG. 2, the first unit 101 detects object areas shown by hatchings in a plurality of time-series continuous input images (feature images) from time t=1 to t=5, using a method of comparing the images with pre-registered background image, for example. The second unit 102 detects stationary areas included in the detected object areas from the continuous input images (feature images) and the detected object areas. As shown in FIG. 2, the second unit 102 obtains pixels in which luminance changes are stable as stable areas from the continuous input images (feature images) with respect to all pixels included in the detected object areas, and in the stable areas of each object unit, detects areas having small motion amount as stationary areas, for example.

Then, the third unit 103 stores, in the storage device 3, information (e.g., information regarding luminance) acquired from the feature extraction unit 21 in the detected stationary areas as time-series background information.

In the case of FIG. 2, as there is no stationary area in the input image (feature image) at t=1, the third unit 103 stores, in the storage device 3, information of stationary areas in the input images (feature images) at t=2 to t=5 as time-series background information. At this time, the third unit 103 may extract information by pixel units from the pieces of time-series background information, and process the information as shown in FIG. 3 to generate a stationary object layer which will be described in detail later. This means that a collection of stationary object layers with respect to all pixels correspond to a plurality of pieces of background information. Finally, the fourth unit 104 compares the time-series background information with the information of the object areas, to thereby detect respective objects included in the object areas.

For example, when comparing the luminance of stationary object layers 1 and 2 of FIG. 3 which are parts of the time-series pieces of background information with that of pixels A and B in the object area at t=5 in FIG. 2, it is noted that the pixel A belongs to the stationary object layer 1 and the pixel B belongs to the stationary object layer 2. As such, the fourth unit 104 can detect that a stationary object including the pixel B overlies a stationary object including the pixel A.

As described above, according to the exemplary embodiment, by handling information of a stationary object area as new background information, an object area can be judged by pixel units or local image units using the temporal relationship between the pieces of background information and the input images. As such, an overlying object can be detected distinctively without using a template image of the target object. Further, by handling information of the stationary object area as new background information, it is possible to allow pieces of background information to have temporal relationships, and to utilize the temporal relationships. As such, even if another stationary object overlies a stationary object, the other stationary object overlying the stationary object can be detected by comparing the pieces of background information which have been stored before the other stationary object exists.

The configuration of the data processing device 2 according to the exemplary embodiment will be described specifically. As shown in FIG. 1, the first unit 101 includes the feature extraction unit 21 and an object detection unit 22. The data processing device also includes a stationary area acquisition unit 23 as the second unit 102, a stationary object layer generation unit 24 as the third unit 103, and an object separative detection unit 25 as the fourth unit 104.

The feature extraction unit 21 extracts feature values of respective pixels of the input images, and outputs the input images as feature images. The object detection unit 22 detects an object area where an object exists from the feature image extracted by the feature extraction unit 21. The stationary area acquisition unit 23 acquires an area where motion is stopped included in the object area detected by the object detection unit 22, as a stationary area. The stationary object layer generation unit 24 generates a stationary object layer and its stationary object layer information based on the feature value of each pixel in the stationary area acquired by the stationary area acquisition unit 23. The object separative detection unit 25 compares the feature value of each pixel in the object area with the stationary object layer information, and detects an object overlying a stationary object.

The stationary area acquisition unit 23 obtains dispersion values from time-series data of the feature values of respective pixels in the object areas, extracts respective pixels having certain dispersion values or lower as stable areas where temporal changes are stable, calculates the amount of motion for the stable areas in object units, and acquires the stable areas having the certain amount of motion or lower as the stationary areas. Further, the stationary area acquisition unit 23 calculates an optical flow by means of template matching with respect to each pixel in the stable area in object units, and calculates the amount of motion by a weighted average obtained by weighting the size of the optical flow with a matching distance or by a weighted average obtained by largely weighting the size of the optical flow near the contour of the object area.

The stationary object layer generation unit 24 compares the feature values of respective pixels in the stationary areas with the reference feature values of the existing stationary object layers, and if there is a stationary object layer having an inter-feature distance which is the closest and is a certain value or smaller, determines that the feature value of the stationary area belongs to the stationary object layer and updates the stationary object layer information, deletes the stationary object layer having a layer generation time later than the layer generation time of the stationary object layer to which the feature value of the stationary area belongs, while if there is no stationary object layer to which the feature value of the stationary area belongs or if there is no existing stationary object layer at all, generates a new stationary object layer and sets information of that stationary object layer, and with respect to the pixels other than those in the object area, deletes all stationary object layers.

When the object separative detection unit 25 compares the feature value of each pixel in the object area with the existing stationary object layer information, the object separative detection unit 25 calculates a detection target time by subtracting the pre-stored detection target period from the current time, and selects one stationary object layer having the time before the detection target time and having the latest layer generation time, as a comparison target. Further, if there is no stationary object layer having the layer generation time before the detection target time and having the latest layer generation time, or if there is no stationary object layer at all, the object separative detection unit 25 detects each pixel in the object area as the object overlying the stationary object. Further, the object separative detection unit 25 sets an absolute value of a difference value between the feature value and the average value or a value obtained by normalizing the absolute value with a standard deviation, to be a distance indicating similarity, using the average value and the dispersion value obtained by referring to the feature value of each pixel in the object area and the selected stationary object layer information, and detects each pixel having a distance indicating similarity of a certain value or larger, as the object overlying the stationary object.

As described above, according to the specific description of the data processing device 2 according to the exemplary embodiment of the invention, the data processing device 2 of the exemplary embodiment includes the feature extraction unit 21 which extracts feature values of all pixels from input images and acquires feature images, and stores the feature images in the image accumulation unit 31; the object detection unit 22 which acquires an object area detected from the feature image as a binarized image, and also extracts a nearby pixel with respect to this binarized image as one object, and acquires an object ID, its rectangle position and a rectangle size of the object; a stationary area acquisition unit 23 which calculates dispersion values of the feature values with respect to all pixels included in the object areas from time series, extracts pixels having dispersion values of a predetermined threshold or lower as stable areas where temporal changes are stable, calculates the amount of motion of the stable area included in each object acquired from the object detection unit, and acquires the area having the amount of motion of a predetermined threshold or lower as a stationary area; a stationary object layer generation unit 24 which acquires, with respect to all pixels included in the stationary areas, feature values and stationary object layer information (a stationary object layer shows a cluster of stationary object information of each stationary object corresponding to a pixel) in the stationary object layer information storing unit 32, determines a stationary object layer to which the feature value belongs by clustering, and updates the stationary object layer information to which it belongs; and an object separative detection unit 25 which, with respect to all pixels included in the object area, calculates a distance indicating similarity using the feature values and the stationary object layer information selected from the detection target period stored in the detection target period storing unit 33, and detects a pixel having a distance indicating similarity of a predetermined threshold or larger as an object overlying a stationary object.

By adopting these configurations, the data processing device 2 exhibits the following effects. The data processing device 2 can distinctively detect an object overlying a stationary object without using a template image of the target object. Further, by storing a feature value with respect to a stationary area as a form of a stationary object layer for each pixel, comparing stationary object layer information selected at the detection target period with the feature value, and detecting an object overlying the stationary object (by determination based on a distance indicating similarity, for example), even if another stationary object overlying the stationary object, the overlaying object can be detected distinctively. Further, by extracting a stable area where time-series changes of the feature values are stable from the object area, calculating the amount of motion of the stable area included in each object acquired from the object detection unit, and determining whether the stable area is a stationary area in object units from the amount of motion, it is possible to prevent a part of an object from being a stationary area with respect to a single-color object moving in one direction.

Next, the exemplary embodiment will be described in more detail with reference to the drawings.

The storage device 3 includes the image accumulation unit 31, the stationary object layer information storing unit 32, and the detection target period storing unit 33.

The image accumulation unit 31 is a FIFO (First In First Out) buffer, and stores n pieces of time-series images. "n" is an amount that time changes in feature values are determined to be stable, and is a predetermined amount. A storing state in the case where (a) in FIG. 5 is a feature image is shown in (b) in FIG. 5.

The stationary object layer information storing unit 32 stores stationary object layer information of each stationary object layer with respect to each pixel. The information to be stored includes layer generation times, reference feature values, the number of feature values, the sum of the feature values, the square sum of the feature values, average values, dispersion values, and the like. FIG. 4 shows an example of stationary object layer information to be stored. Note that the reference feature values exemplary shown in FIG. 4 are feature values of pixels at layer generation times.

The detection target period storing unit 33 stores detection target periods. Detection target period means a period required for determining a detection target regarding a stationary object overlying a stationary object. Assuming that this period is $t_x$, an overlying stationary object which stops within a time $t_x$ before the current time and an overlying moving object can be detected.

The data processing device 2 includes the feature extraction unit 21, the object detection unit 22, the stationary area acquisition unit 23, the stationary object layer generation unit 24, and the object separative detection unit 25.

The feature extraction unit 21 extracts feature values with respect to all pixels from the input images acquired by the image acquisition unit 1, and output them as feature images. Feature values include a luminance value, a color phase, each value of RGB, edge, a distance value from a camera to an object, and the like, and values which become stable when an object rests and become unstable when the object moves are basically acceptable.

The object detection unit 22 detects an object area from the feature image acquired by the feature extraction unit 32, and outputs it as a binarized image. Further, the object detection unit 22 extracts a nearly pixel with respect to the binarized image as one object, and with respect to the object, an object ID, its rectangle position and rectangle size are output. Specifically, the object detection unit 22 uses a background difference method which is one of objection detection methods, and binarization processing by a threshold, to thereby acquire a binarized image which is an object area. Further, the object detection unit 22 performs expansion processing or contraction processing using a logical filter which is one of image processing on the binarized image, to make a nearby pixel to be one object. Further, after performing labeling processing which is one of image processing, the object detection unit 22 obtains and outputs an object ID of each labeled object and its rectangle position and rectangle size. Another method may be used of course, if all objects can be extracted from the feature images. Further, the objects to be detected in this stage are output as one object if the objects overlap each other. Assuming that FIG. 5(a) shows a feature image, FIG. 5(c) shows a binarized image, an object ID, its rectangle position and rectangle size of the acquired object area. In FIG. 5(a), a reference numeral 41 shows a moving person, 42 shows a stationary person, 43 shows a stationary bus, 44 shows a moving vehicle, and 45 shows a background tree. In FIG. 5(c), the shaded portion is an acquired object area.

The stationary area acquisition unit 23 acquires information from the object detection unit 22 and the image accumulation unit 31, and outputs a stationary area where motion is stopped in the object area as a binarized image. Specifically, the stationary area acquisition unit 23 first calculates dispersion values from feature values accumulated in chronological order in the image accumulation unit 31 with respect to all pixels included in the object area acquired from the object detection unit 22, determines that pixels having dispersion values of a predetermined threshold or smaller to be pixels in which temporal changes are stable, and extracts the pixels as stable areas. Then, the stationary area acquisition unit 23 calculates one amount of motion with respect to the stable area of each object, and acquires an area having an amount of motion of a predetermined threshold or smaller as a stationary area. By using the amount of motion, it is possible to eliminate a portion which would be erroneously determined as a stationary area in a single-color moving object. Linkage between each object and its object area is performed by the object ID and its rectangular position and rectangular size.

Further, the amount of motion is an amount which becomes larger when the area (special mass) is moving and becomes smaller when it rests. Methods of calculating the amount of motion include, among others, calculating optical flows with respect to all pixels included in the stable areas in object units and calculating an average thereof, calculating an optical flow by template matching and calculating a weighted average by weighting the size thereof with a matching distance, and calculating optical flows and calculating a weighted average by largely weighting the size near the contour of the object area. Note that an optical flow is a flow in which motion of an object is indicated by a vector in temporarily continuing digital images. Assuming that FIG. 5(c) shows a binarized image of the object area, the shaded portion in FIG. 5(d) shows a stable area to be acquired, and the shaded portion in FIG. 5(e) shows a stationary area to be acquired.

The stationary object layer generation unit 24 updates the stationary object layer information of the stationary object layer information storing unit 32 using the feature image obtained from the feature extraction unit 21, the binarized image obtained from the stationary area acquisition unit 23, and the stationary object layer information of the stationary object layer information storing unit 32. Specifically, the stationary object layer generation unit 24 first acquires a feature value Xi of a feature image obtained from the feature extraction unit 21 and all reference feature values from the stationary object layer information storing unit 32, with respect to all pixels included in the stationary area obtained from the stationary area acquisition unit 23. The stationary object layer generation unit 24 uses those values to perform clustering by means of Nearest Neighbor method (hereinafter referred to as "NN method") for each pixel to thereby determine a stationary object layer to which the feature value $X_i$ belongs. If the feature value $X_i$ belongs to an existing stationary object layer, with respect to the stationary object layer to which it belongs, the stationary object layer generation unit updates the feature value number $N_i$ in accordance with Expression (1), updates the sum $S_i$ of the feature values in accordance with Expression (2), updates the square sum $U_i$ of the feature values in accordance with Expression (3), updates the average value $\mu_i$ in accordance with Expression (4), and updates the dispersion value $\sigma^2_i$ in accordance with Expression (5). Further, the stationary object layer generation unit 24 compares the layer generation time of the belonging stationary object layer with layer generation times of other stationary object layers, and deletes the stationary object layers having later layer generation times than the layer generation time of the stationary object layer to which it belongs. This is because as an old stationary object layer appears again, it is presumed that a resting object is removed. FIG. 6 shows an example of a deleted stationary object layer (stationary object layer 2).

[Expression 1]

$$N_i(x,y,l)=N_{i-1}(x,y,l)+1 \quad (1)$$

[Expression 2]

$$S_i(x,y,l)=S_{i-1}(x,y,l)+X_i(x,y) \quad (2)$$

[Expression 3]

$$U_i(x,y,l)=U_{i-1}(x,y,l)+(X_i(x,y))^2 \quad (3)$$

[Expression 4]

$$\mu_i(x, y, l) = \frac{S_i(x, y, l)}{N_i(x, y, l)} \quad (4)$$

[Expression 5]

$$\sigma^2_i(x, y, l) = \frac{N_i(x, y, l)U_i(x, y, l) - (S_i(x, y, l))^2}{N_i(x, y, l)(N_i(x, y, l) - 1)} \quad (5)$$

Note that X represents a feature value, N represents the number of feature values, S represents the sum of the feature values, U represents the square sum of the feature values, $\mu$ represents an average value, $\sigma^2$ represents a dispersion value, i−1 represents before update, i represents after update, (x,y) represents the position of a pixel, and l represents a stationary object layer to which it belongs.

If there is no stationary object layer to which the feature value $X_i$ belongs, or if there is no existing stationary object layer at all, a new stationary object layer is generated, and the current time is set to be the layer generation time, the feature value number $N_i$ is set to be 1, the feature value $X_i$ is set to be the sum of the reference feature value and the feature value, the square of the feature value $X_i$ is set to be the square sum of the feature values, the average value $\mu_i$ is set in accordance with Expression (4), and the dispersion value $\sigma^2_i$ is set in accordance with Expression (5). Further, for pixels other than those in the object area acquired from the object detection unit 22, it is assumed that all stationary objects are deleted and the background appears, and all stationary object layers with respect to the pixels are deleted. Thereby, the stationary object layer information of the stationary object layer information storing unit 32 is able to be updated.

Next, clustering by the NN method described herein will be described. First, with respect to a pixel, all of the feature values X and the reference feature values B of the stationary object layer are acquired, and a minimum inter-feature distance $d_{min}$ is calculated in accordance with Expression (6).

[Expression 6]

$$d_{min} = \min_{l \in L(x,y)} (|X(x, y) - B(x, y, l)|) \quad (6)$$

Note that X represents a feature value, B represents a reference feature value of a stationary object layer, (x,y) represents a position of a pixel, l represents a stationary object layer, L(x, y) represents all stationary object layers with respect to the pixel.

If the minimum inter-feature distance $d_{min}$ is smaller than a predetermined threshold $d_{th}$, it is determined that the feature value X belongs to the stationary object layer l giving the minimum inter-feature distance $d_{min}$. If the minimum inter-feature distance $d_{min}$ is the threshold $d_{th}$ or larger, it is determined that there is no stationary object layer to which it belongs, and a new stationary object layer is generated. This is the process of clustering by the NN method described herein.

The object separative detection unit 25 detects an object overlying a stationary object by determining a distance indicating similarity, using a feature value of a feature image acquired from the feature extraction unit 21 and stationary object layer information stored in the stationary object layer information storing unit 32 selected from the detection target period stored in the detection target period storing unit 33, with respect to all pixels included in the object area obtained from the object detection unit 22. Specifically, the object separative detection unit 25 first calculates the detection target time by subtracting the detection target period stored in the detection target period storing unit 33 from the current time. Then, the object separative detection unit 25 acquires a feature value of a feature image obtained from the feature extraction unit 21 with respect to all pixels included in the object area obtained from the object detection unit 22, and selects a stationary object layer having the layer generation time before the calculated detection target time and is the latest, from the stationary object layer information storing unit 32. The object separative detection unit 25 uses the acquired feature value and the selected stationary object layer information to calculate a distance D indicating similarity in accordance with Expression 7 or Expression 8 to thereby detect a pixel having a distance indicating similarity of a predetermined threshold or larger as an object overlying the stationary object. In addition, if there is no stationary object layer satisfying the conditions in the selection of a stationary object layer, or if there is no stationary layer at all, it is detected as an object overlying the stationary object.

[Expression 7]

$$D(x,y)=|X(x,y)-\mu(x,y,l)| \quad (7)$$

[Expression 8]

$$D(x, y) = \frac{|X(x, y) - \mu(x, y, l)|}{\sqrt{\sigma^2(x, y, l)}} \quad (8)$$

Note that X represents a feature value, $\mu$ represents an average value, $\sigma^2$ represents a dispersion value, (x,y) represents a position of a pixel, and l represents a selected stationary object layer.

Thereby, an overlying stationary object which is stopped within the detection target time from the current time and the overlying moving object can be detected. If it is set that the detection target time is 0, only the overlying moving object can be detected. FIG. 7 shows an example of object separative detection.

Next, operation of the object area detection system 100 according to the exemplary embodiment of the invention will be described in detail with reference to FIGS. 1 and 8 to 14.

First, as shown in FIGS. 1 and 8, to the detection target period storing unit 33, a detection target period which is a time period necessary for determining a detection target of a stationary object overlying a stationary object is set (step S1). The image acquisition unit 1 acquires images from a moving image taken by a camera, video, or the like (step S2). The feature extraction unit 21 extracts feature values with respect to all pixels from the acquired images, and acquires feature images (step S3), and also stores the acquired feature images in the image accumulation unit 31 (step S4). The object detection unit 22 acquires a binarized image as an object area by means of a conventional method from the acquired feature image, and further extracts a nearby pixel as one object by performing a conventional method on the binarized image, and acquires an object ID and its rectangle position and rectangle size of the object. The binarized image showing the object area also becomes the final output (step S5). The object area acquired in this stage is to be output as one object when objects overlap each other. The stationary area acquisition unit 23 sets an area in which motion is stopped in the object area to be a stationary area, and acquires a binarized image thereof (step S6).

Now, step S6 will be described in more detail based on FIGS. 9 and 10. The stationary area acquisition unit 23 first determines whether or not there is an object area in the binarized image acquired by the object detection unit 22 (step S601). If there is no object area, the stationary area acquisition unit 23 does not acquire a stationary area. If there is an object area, the stationary area acquisition unit 23 selects one pixel included in the object area (step S602), and with respect to the pixel, calculates a dispersion value from the feature values stored in chronological order in the image accumulation unit 31 (step S603). The stationary area acquisition unit 23 determines whether or not the dispersion value is a predetermined threshold or smaller (step S604), and if the value is the predetermined threshold or smaller, extracts the selected pixel as a stable area (step S605). Then, the stationary area acquisition unit 23 determines whether or not processes of steps S602 to S605 are performed on all pixels included in the object area (step S606). The processes from step S602 to step S606 are repeated until the processes have been performed on all pixels included in the object area.

Then, at step S6, the stationary area acquisition unit 23 determines whether or not there is a stable area (whether or not a stable area is acquired) (step S607). If there is no stable area, the stationary area acquisition unit 23 does not acquire a stationary area. If there is a stable area, the stationary area acquisition unit 23 selects one stable area corresponding to the object, using the object ID and the rectangle position and the rectangle size thereof acquired by the object detection unit 22 (step S608). The stationary area acquisition unit 23 calculates the amount of motion with respect to the area (step S609), and determines whether the amount is a predetermined threshold or smaller (step S610). The stationary area acquisition unit 23 extracts the selected stable area as a stationary area only when the amount is the threshold or smaller (step S611). Then, the stationary area acquisition unit 23 determines whether or not the processes of steps S608 to S611 are performed on all stable areas corresponding to the object (step S612). The processes from step S608 to step S612 are repeated until the steps have been performed on all stable areas corresponding to the object. Through these steps, a stationary area is acquired.

Then, as shown in FIGS. 1 and 8, the stationary object layer generation unit 24 acquires feature values with respect to all pixels included in the stationary area, and updates the stationary object layer information in the stationary object layer information storing unit 32 (step S7).

Now, step S7 will be described in more detail based on FIGS. 11 and 12. The stationary object layer generation unit 24 first determines whether or not there is a stationary area in the binarized image acquired by the stationary area acquisition unit 23 (step S701). If there is a stationary area, the stationary object layer generation unit 24 selects one pixel included in the stationary area (step S702), and acquires a feature value corresponding to the pixel from the feature extraction unit 21 (step S703). Further, the stationary object layer generation unit 24 determines whether or not there is a stationary object layer with respect to the pixel from the stationary object layer information storing unit 32 (step S704), and if there is a stationary object layer, acquires all reference feature values of the stationary object layer corresponding to the pixel selected from the stationary object layer information storing unit 32 (step S705). The stationary object layer generation unit 24 uses all of the feature values acquired at step S703 and the reference feature values of the stationary object layer acquired at step S705, calculates a minimum inter-feature distance $d_{min}$ in accordance with Expression 6 (step S706), and determines whether or not the minimum inter-layer distance $d_{min}$ is a predetermined threshold $d_{th}$ or smaller (step S707). If there is no stationary object layer at step S704, or if the minimum inter-feature distance $d_{min}$ is not the threshold $d_{th}$ or smaller at step S707, the stationary object layer generation unit 24 generates a new stationary object layer with respect to the selected pixel, sets the current time to be a layer generation time, sets the feature value number $N_i$ to be 1, sets the feature value $X_i$ to be the sum of the reference feature value and the feature value, sets the square of the feature value $X_i$ to be the square sum of the feature value, sets an average value $\mu_i$ in accordance with Expression (4), and sets a dispersion value $\sigma^2_i$ in accordance with Expression (5) (step S708). If the minimum inter-feature distance $d_{min}$ is the threshold $d_{th}$, or smaller at step S707, the stationary object layer generation unit 24 determines that the feature value belongs to a stationary object layer giving the minim inter-feature distance $d_{min}$ and with respect to the stationary object layer to which it belongs, updates the feature value number $N_i$ in accordance with Expression (1), updates the sum $S_i$ of the feature value in accordance with Expression (2), updates the square sum $U_i$ of the feature values in accordance with Expression (3), updates the average value $\mu_i$ in accordance with Expression (4), and updates the dispersion value $\sigma^2_i$ in accordance with Expression (5) (step S709).

Further, with respect to the selected pixel, the stationary object layer generation unit 24 determines whether or not there is a stationary object layer other than the stationary object layer to which the feature value belongs (step S710), and if there is any stationary object layer, selects one stationary object layer other than the stationary object layer to which the value belongs (step S711). The stationary object layer generation unit 24 determines whether or not the layer generation time of the selected stationary object layer is later than the layer generation time of the stationary object layer to which the feature value belongs, and if it is later, deletes the selected stationary object layer from the stationary object layer information storing unit 32 (step S713). Then, the stationary object layer generation unit 24 determines whether or not the processes of step S711 to S713 are performed on all stationary object layers other than the stationary object layer to which the feature value belongs (step S714). The processes from step S711 to S714 will be repeated until the processes have been performed on all stationary object layers other than the stationary object layer to which the feature value belongs. When the process of step S708 has been completed, or if there is no stationary object layer other than the stationary object layer to which it belongs at step S710, or if the processes from step S711 to step S714 have been completed, the stationary object layer generation unit 24 determines whether or not the processes of steps S702 to S714 have been performed on all pixels included in the stationary area (step S715). The processes from step S702 to step S715 will be repeated until the processes have been performed on all pixels included in the stationary area. If there is no stationary object layer at step S701, or if the processes from step S702 to step S715 have been completed, the stationary object layer generation unit 24 deletes all stationary object layers with respect to the pixels other than those in the object area acquired by the object detection unit 22 (step S716). Through these steps, the stationary object layer information in the stationary object layer information storing unit 32 is able to be updated.

Then, as shown in FIGS. 1 and 8, the object separative detection unit 25 acquires the feature values with respect to all pixels included in the object area and the stationary object layer information stored in the stationary object layer information storing unit 32, and determines a distance indicating similarity to thereby output an object overlying the stationary object (step S8).

Now, step S8 will be described in more detail based on FIGS. 13 and 14. The object separative detection unit 25 first determines whether there is an object area in the binarized image acquired by the object detection unit 22 (step S801). If there is no object area, the object separative detection unit 25 determines that there is no object and also there is no object overlying a stationary object. If there is an object area, the object separative detection unit 25 calculates the detection target time by subtracting the detection target period stored in the detection target period storing unit 33 from the current time (step S802). Then, the object separative detection unit 25 selects one pixel included in the object area (step S803), and acquires a feature value corresponding to the pixel selected from the feature extraction unit 21 (step S804). Further, with reference to the selected pixel, the object separative detection unit 25 determines whether there is any stationary object layer, using the stationary object layer information storing unit 32 (step S805). If there is any stationary object layer, the object separative detection unit 25 determines whether there is a stationary object layer having a layer generation time which is before the detection target time and the latest, using the stationary object layer information storing unit 32 (step S806).

If there is a stationary object layer, the object separative detection unit 25 selects a stationary object layer satisfying the conditions of step S806 (step S807), and calculates a distance D indicating similarity using the feature value acquired at step S804 and Expression (7) or Expression (8) (step S808). The object separative detection unit 25 determines whether or not the distance D indicating similarity is a predetermined threshold or larger (step S809), and if it is not the threshold or larger, the object separative detection unit 25 determines that the selected pixel is not an object overlying the stationary object. If there is no stationary object layer at step S805, or if there is no stationary object layer satisfying the conditions of step S806, or if the distance D indicating similarity is the threshold or larger at step S809, the object separative detection unit 25 determines that the selected pixel is an object overlying the stationary object and extracts it (step S810). Then, the object separative detection unit 25 determines, whether or not the processes of steps S803 to S810 are performed on all pixels included in the object area (step S811). The processes from step S803 to step S811 are repeated until the processes have been performed on all pixels included in the object area. Through these steps, an object overlying the stationary object can be output as a final output.

In FIG. 8, the processes from step S2 to step S8 are repeated during the time that an image is acquired at step S2.

Next, effects of the exemplary embodiment will be described.

As the exemplary embodiment of the invention realizes a configuration of not using a template image of a target object by obtaining an object area where an object exists from a feature image, obtaining a stationary area where motion of a feature value is stopped from the object area, extracting a feature value with respect to the stationary area and storing it as a stationary object layer, and detecting an object overlying a stationary object from the feature value and the stored stationary object layer, the overlying object can be detected distinctively without using a template image of the target object. As such, even if a new object appears from an object and the appearing position or the appearing timing of the new object is unknown so that a template image of the target object cannot be acquired, the overlying object can be detected distinctively.

Further, as the exemplary embodiment of the invention is configured to store a feature value with respect to a stationary area for each pixel as a form of a stationary object layer, select the stationary object layer with use of a detection target period, compare the feature value with the selected stationary object layer to thereby detect an object overlying the stationary object (according to a determination by a distance indicating their similarity, for example) (preferably by managing in the stationary object layer the time that the stationary object starts resting), even if another stationary object overlies a stationary object, the overlying object can be detected distinctively. Further, by changing the detection target period, the stationary object overlying the target stationary object can be detected based on the resting start time.

Further, in the exemplary embodiment of the invention, by extracting a stable area in which time-series changes of a feature value is stable from an object area, calculating the amount of motion of the stable area included in each object obtained from the object detection unit, and determining whether or not the stable area is a stationary area in object units from the amount of motion, a pixel which may be erroneously determined as a stationary area in time-series changes in pixel units can be excluded from the stationary area with use of spatial mass information which is an amount of motion in object units. As such, for a single-color object moving in one direction, it is possible to prevent a part of the object from being determined as a stationary area, so that it is possible to prevent erroneous detection if there is an overlying object on such a moving object.

Further, as the exemplary embodiment of the invention uses a distance indicating similarity between the feature value and the selected stationary object layer for determining an object overlying the stationary object, and for calculating the distance, uses amounts such as an average value and a dispersion value, capable of absorbing fluctuation components, acquired with reference to the stationary object layer, the exemplary embodiment is able to cope with lighting fluctuations, environmental fluctuations, and the like.

FIG. 15 is a block diagram showing an example in which the exemplary embodiment of the invention as shown in FIG. 1 is further embodied. Hereinafter, description will be given based on FIG. 15. The same parts as those of FIG. 1 are denoted by the same reference numerals and their description is not repeated.

In this example, the image acquisition unit 1, and the storage device 3 including the image accumulation unit 31, the stationary object layer information storing unit 32 and the detection target time storing unit 33, are connected to a computer 4, and a computer readable storage medium 6 storing an object area detection program 5 is also connected to the computer 4. The computer readable medium 6 is configured of a magnetic disk, a semiconductor memory, or the like, and the object area detection program 5 stored therein is read by the computer 4 when the computer 4 starts or the like, and the program controls operation of the computer 4 so as to allow the computer 4 to function as the respective units 101 to 104 or the respective units 21 to 25 in the data processing device 2 shown in FIG. 1 and to perform processes shown in FIGS. 8 to 14.

Next, an example of an object area detection method according to the exemplary embodiment of the invention will be described.

An object area detection method according to the exemplary embodiment of the invention is the same as the operation of the exemplary embodiment shown in FIG. 1, that is, the processes shown in FIGS. 8 to 14. As such, the object area detection method according to the exemplary embodiment of the invention includes, as shown in FIG. 8, a step "a" of detecting object areas in a plurality of time-series continuous input images, a step "b" of detecting stationary areas included in the object areas from the plurality of time-series continuous input images, a step "c" of accumulating information of the stationary areas as time-series background information, and a step "d" of comparing the time-series background information with the object areas and detecting respective objects included in the object areas. Specifically, the method includes a first step (steps S2 to S4) and a second step (step S5) as the step "a", a third step (step S6) as the step "b", a fourth step (step S7) as the step "c", and a fifth step (step S8) as the step "d". In the first step, a feature value is extracted for each pixel of the input image and the input image is output as a feature image. In the second step, an object area in which an object exists is detected from the feature image. In the third step, an area where the motion included in the object area is stopped is acquired as a stationary area. In the fourth step, based on the feature value of each pixel of the stationary area, a stationary object layer and stationary object layer information thereof are generated. In the fifth step, the feature value of each pixel in the object area and the existing stationary object layer information are compared, and the object overlying the stationary object is detected.

Further, the object area detection method according to the exemplary embodiment of the invention may be configured to include comparing the input images and the background information to thereby detect an object area, storing information of an area of a stationary object as another background information when the object rests, and comparing the stored pieces of background information with the input images to thereby detect each object area.

In that case, the area of the stationary object may be an area which is in a pixel included in an object area detected by comparing the input images and the background information, and is a stable area where temporal changes of the feature value of the input image is stable, and in an stable area in object units in which a pixel near the detected object area is considered as one object, spatial motion is small. Further, storing as another new background information may, in a pixel included in the area of the stationary object, selecting background information similar to the feature value of the input image from the stored pieces of background information and updating the feature value of the input image to that background information, or if there is no similar background information, generating another background information from the feature value of the input image. Further, detecting an area of each object through comparison may, in a pixel included in the detected object area through comparison between the input image and the background information, using the feature value of the input image and the stored background information, determining whether or not they are similar and if they are not similar, detecting it as an object overlying the stationary object.

Further, the object area detection method according to the present invention may include an image acquisition process of acquiring an image from a moving image, a feature extraction process of extracting a feature value from the image, an object detection process of acquiring an object area and an object ID of an object and a rectangle position and a rectangle size thereof from a feature image, a stationary area acquisition process of acquiring an area in which motion is stopped in the object area, a stationary object layer generation process of acquiring a feature value of all pixels with respect to the stationary area and generating information of a stationary object for each stationary object as stationary object layer information, and an object separative detection process of acquiring the feature value of all pixels included in the object area and the stationary object layer information stored in the stationary object layer information storing unit and detecting an object overlying the stationary object according to a determination by a distance indicating similarity.

In that case, the stationary area acquisition process may include obtaining a dispersion value of the feature values with respect to all pixels included in the object area from time sequence, extracting the pixels having the dispersion value of a predetermined threshold or lower as a stable area where temporal changes are stable, calculating the amounts of motion of the stable area in the respective objects obtained from the object detection unit, and acquiring an area having the amounts of motion of a predetermined threshold or lower as a stationary area.

The stationary object layer generation process may be configured such that the feature values of all pixels included in the stationary area are compared with the reference feature values of all pieces of stationary object layer information stored in the pixels, and if an inter-feature distance is the closest and is a predetermined threshold or lower, it is determined to belong to that stationary object layer and the stationary object layer information is updated, and further, a stationary object layer having a layer generation time which is later than the layer generation time of the stationary object layer to which it belongs is deleted, and if there is no stationary object layer to which the feature value belongs or if there is no existing stationary object layer at all, a new stationary object layer is generated and information of that stationary object layer is set, and regarding the pixels other than those in the object area, all stationary object layers are deleted.

The object separative detection process may be configured such that when the feature value in the object layer and the stationary object layer information are compared, a detection target time is calculated by subtracting the detection target period stored in the detection target period storing unit from the current time, and one stationary object layer having a layer generation time, which is before the calculated detection target time and the latest, is selected and compared.

The object separative detection process may be configured such that if there is no stationary object layer satisfying the above-described conditions or if there is no stationary object layer at all, it can be detected as an object overlying the stationary object.

Determination by a distance indicating similarity in the object separative detection process may be configured such that by using an average value and a dispersion value obtained by referring to a feature value in the object area and the selected stationary object layer information, an absolute value of the difference value between the feature value and the average value or a value obtained by normalizing an absolute value of the difference value between the feature value and the average value with a standard deviation, is set to be a distance indicating similarity, and a pixel having a distance indicating similarity of a predetermined threshold or larger is detected as an object overlying the stationary object.

The amount of motion may be calculated by obtaining an optical flow by template matching with respect to all pixels included in the stationary area in object units, and using the weighted average obtained by weighting the size of the optical flow with a matching distance, or by obtaining an optical flow and using a weighted average obtained by largely weighting the size of the optical flow near the contour of the object area.

According to the object area detection method of the exemplary embodiment of the invention, actions and effects which are the same as those of the exemplary embodiment shown in FIG. 1 are achieved. Further, the object area detection method according to the exemplary embodiment may be configured in accordance with the configuration of the exemplary embodiment described above of the object area detection device and the like of the exemplary embodiment of the invention, and the object area detection device and the like according to the exemplary embodiment of the invention may be configured according to the above-described configuration of the object area detection method according to the exemplary embodiment of the invention.

Needless to way, the present invention is not limited to the above-described exemplary embodiment. For example, each of the units of the data processing device may be realized by dedicated IC.

Further, in the above exemplary embodiment, although each of the all pixels is used as a detection target, the case where an average value of the feature values of a plurality of adjacent pixels is used and the plurality of pixels are treated as one pixel is also included in the present invention. In that case, the processing speed can be improved and the memory capacity can be reduced.

Further, the case where only pixels of specific coordinates are set to be detection targets is also included in the present invention. For example, a plurality of points including a point A, a point B and a point C in FIG. 7 may be set to be detection targets. Even with this configuration, overlaps between the respective points or overlaps between the objects to which the respective points belong can be detected. Even in that case, the processing speed can be improved and the memory capacity can be reduced.

Although the object area detection device according to the exemplary embodiment of the invention is constructed as hardware, the present invention is not limited to this configuration. The exemplary embodiment of the invention may be constructed as an object area detection program, and it is also acceptable that by causing the program to be executed by a computer, the functions of the object area detection device are realized. The object area detection program is stored in a recording medium and is subjected to business transaction in that state.

While the present invention has been described with reference to the embodiments (and examples), the present invention is not limited to these embodiments (and examples). Various changes in form and details of the present invention, which can be understood by a person skilled in the art, may be made within the scope of the present invention.

INDUSTRIAL APPLICABILITY

The present invention is applicable to an object area detection device in which even if a stationary object or a moving object overlies another stationary object in an image captured by one camera, the overlying object can be detected distinctively, and also applicable to programs and the like to realize the object area detection device in a computer. Further, in the monitoring field in which it is necessary to detect an objet overlying a stationary object from a camera or stored images, the present invention is applicable to devices and functions for detecting intruders, detecting suspicious individuals, detecting abandoned suspicious objects, detecting luggage lifting, detecting tailgating, and detecting congestions and queues. Further, the present invention is applicable to an input interface or the like to which a detecting position of an object overlying a stationary object from a camera or stored images is input. Further, the present invention is applicable to video/image searching devices and functions using detection of an object overlying a stationary object as a trigger key.

BRIEF DESCRIPTION OF THE DRAWINGS

FIG. 4 is a table showing an example of stationary object layer information in the exemplary embodiment of FIG. 1;

REFERENCE NUMERALS

Figure 1:
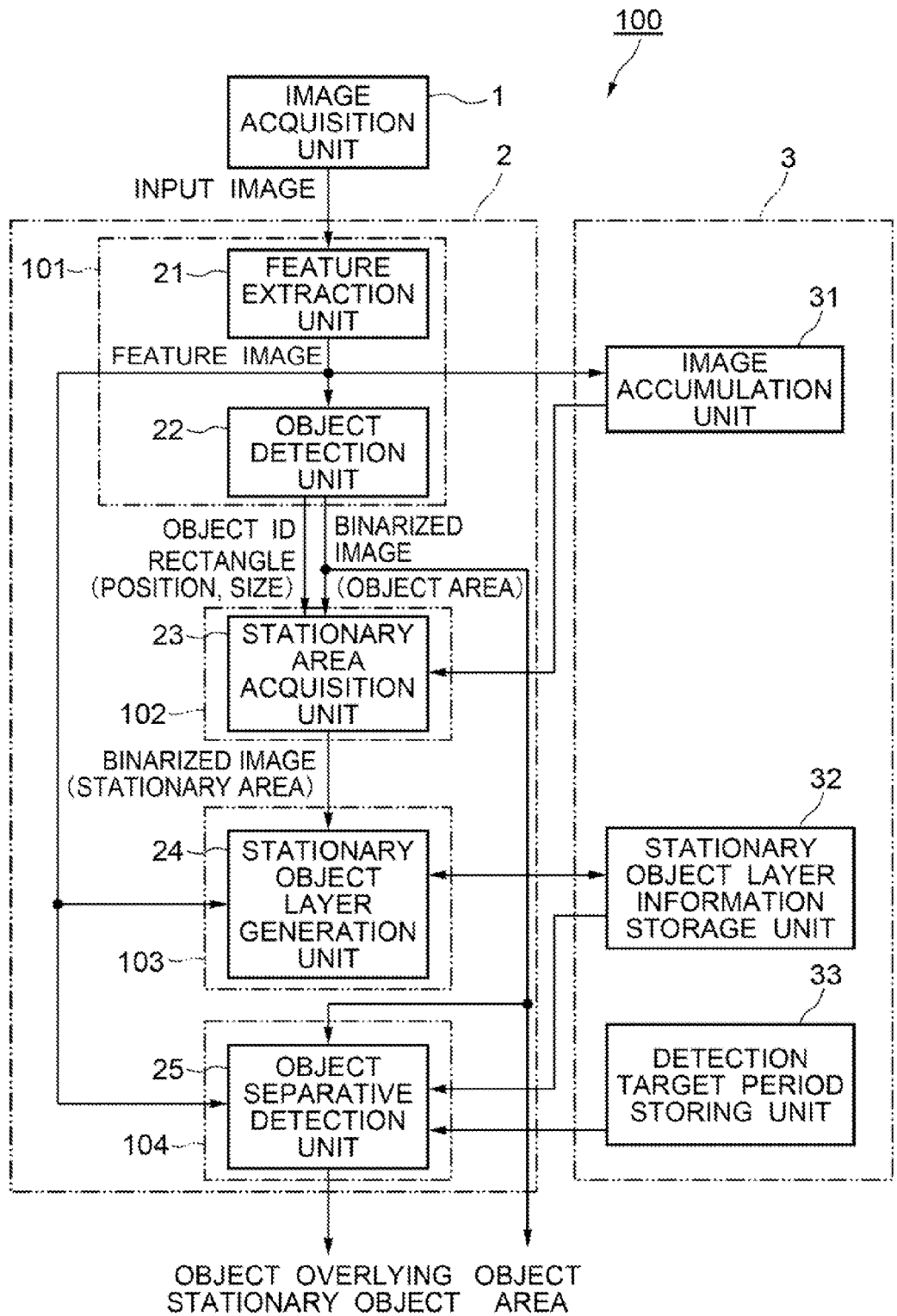
FIG. 1 is a block diagram showing an exemplary embodiment of an object area detection device and an object area detection system according to the present invention.
Figure 2:
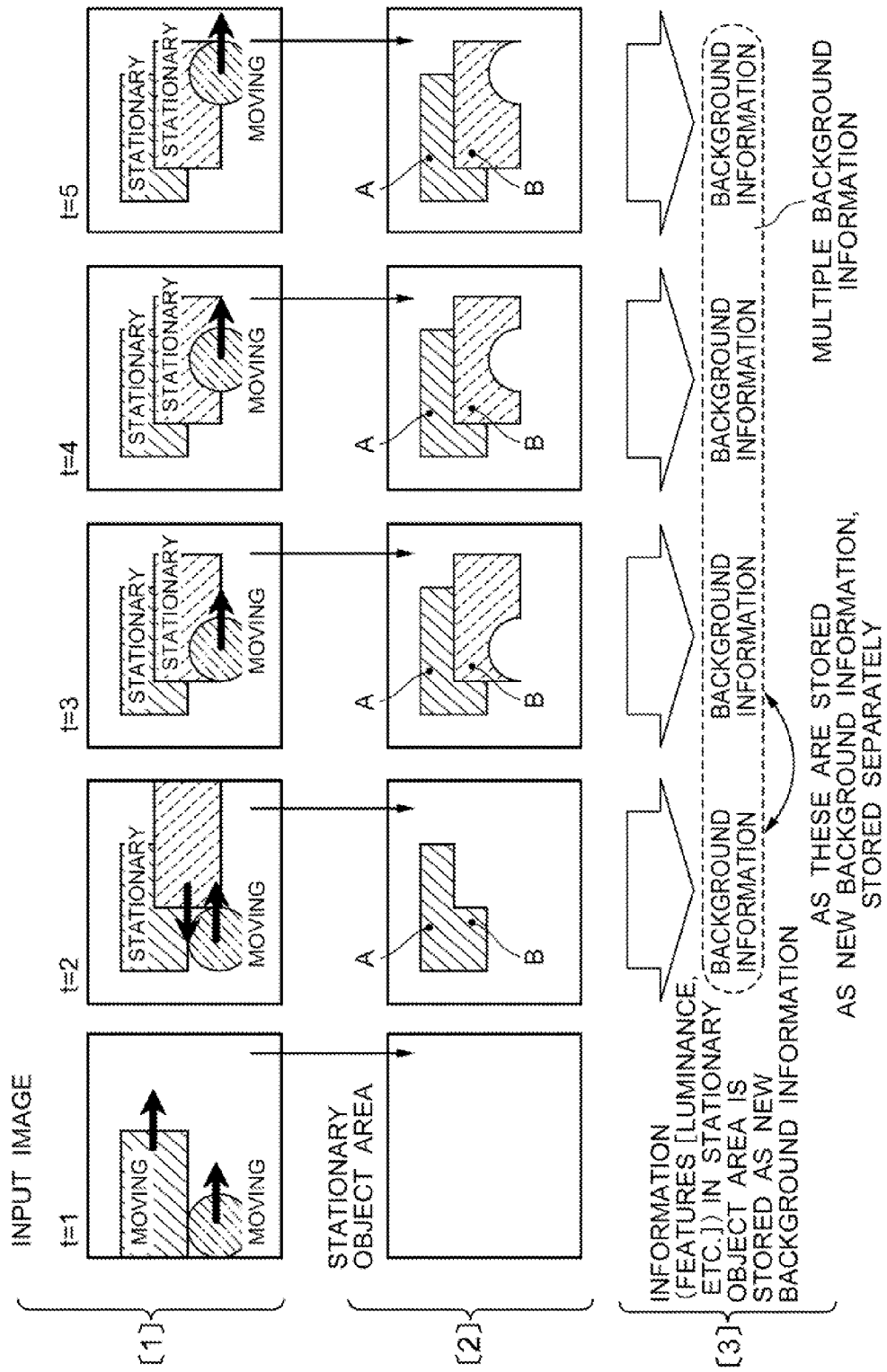
FIG. 2 is an illustration showing outlines of operation (Part 1) in the exemplary embodiment of FIG. 1.
Figure 3:
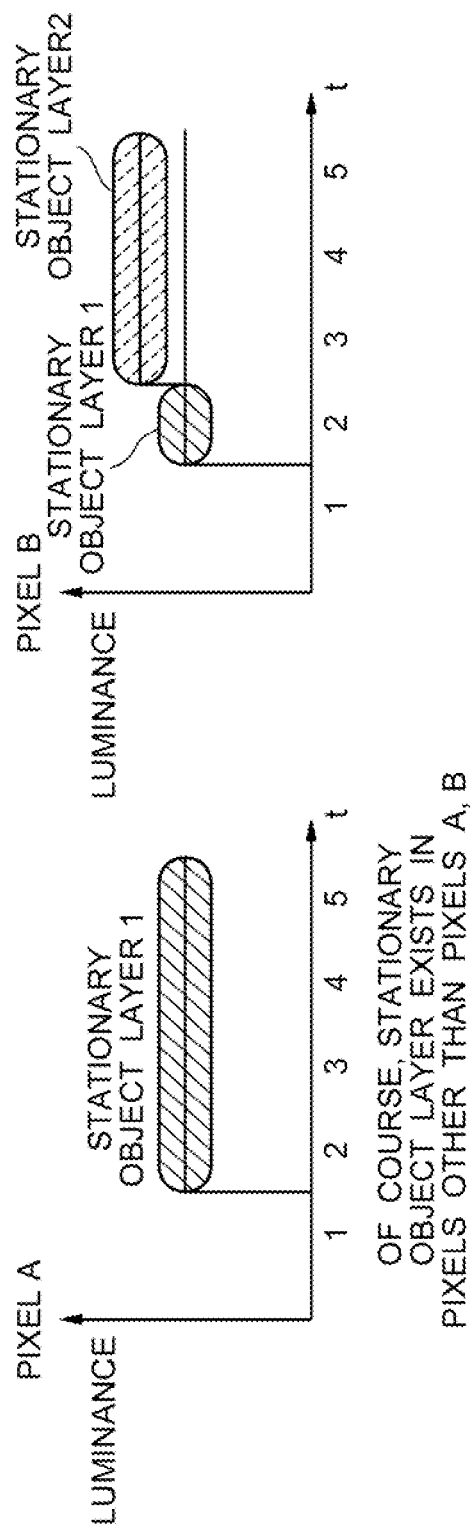
FIG. 3 is an illustration showing outlines of operation (Part 2) in the exemplary embodiment of FIG. 1.
Figure 5:
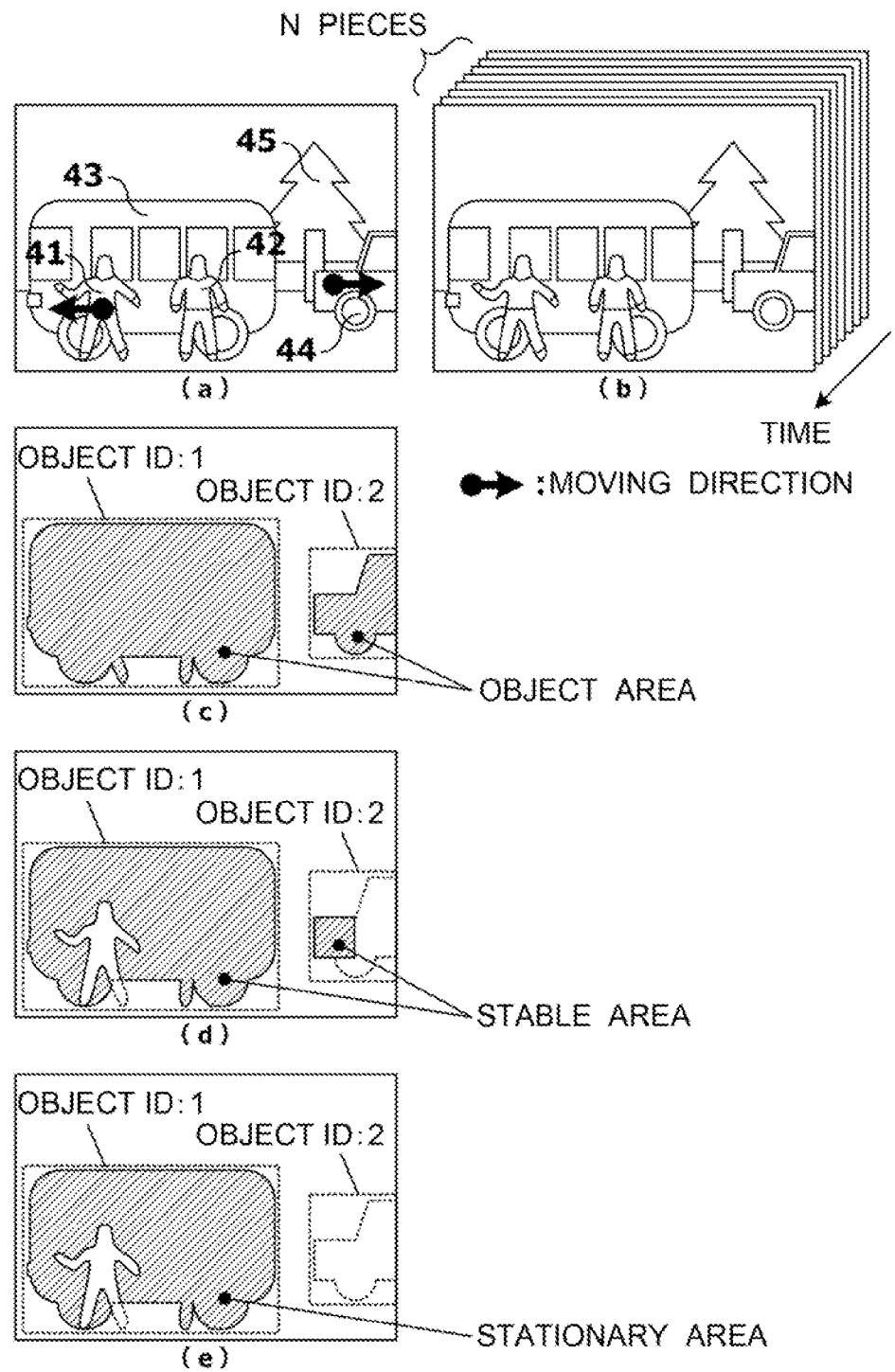
FIG. 5 is an illustration showing an example of processing procedures in the exemplary embodiment of FIG. 1.
Figure 6:
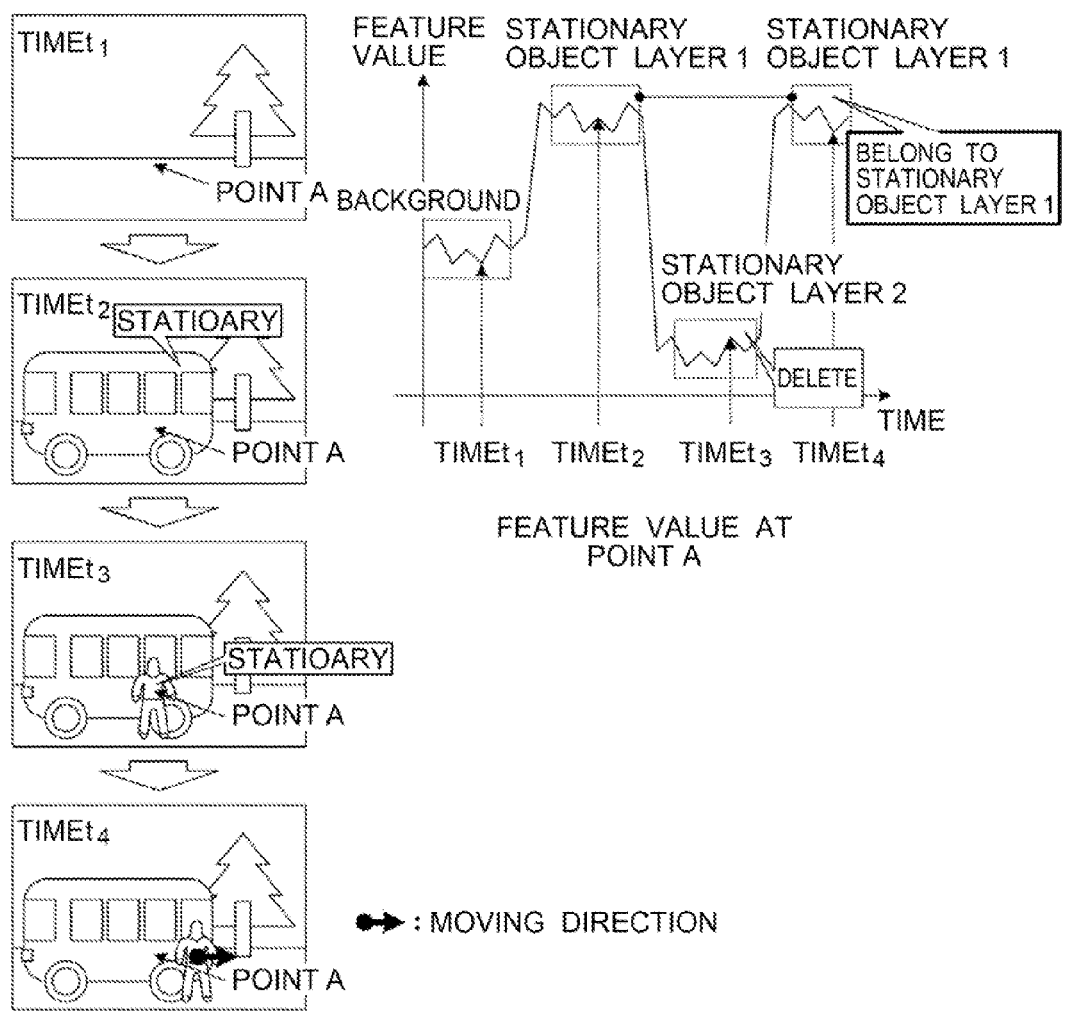
FIG. 6 is an illustration showing an example of a stationary object layer to be deleted by a stationary object layer generation unit in the exemplary embodiment of FIG. 1.
Figure 7:
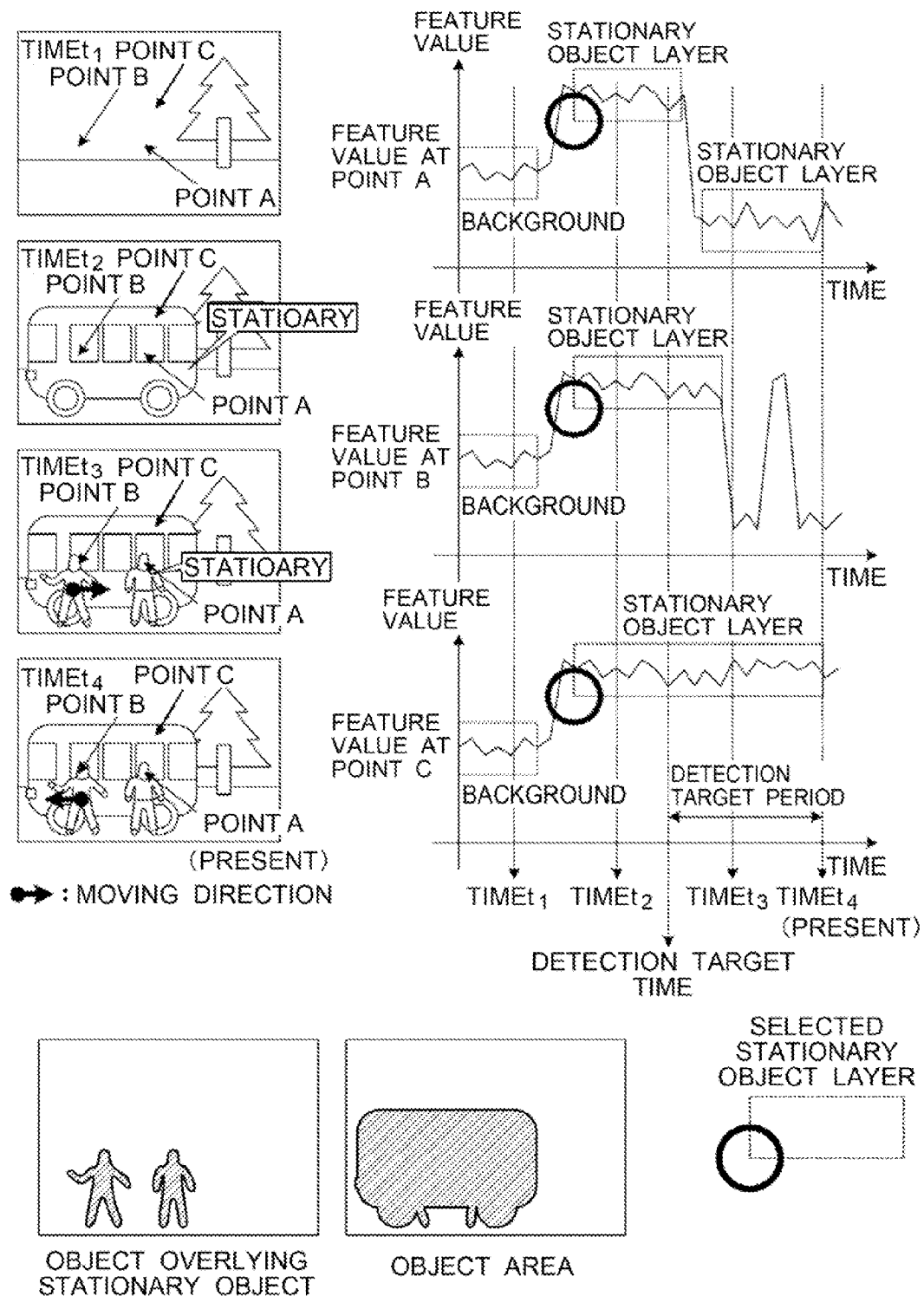
FIG. 7 is an illustration showing an example of object separative detection in the exemplary embodiment of FIG. 1.
Figure 8:
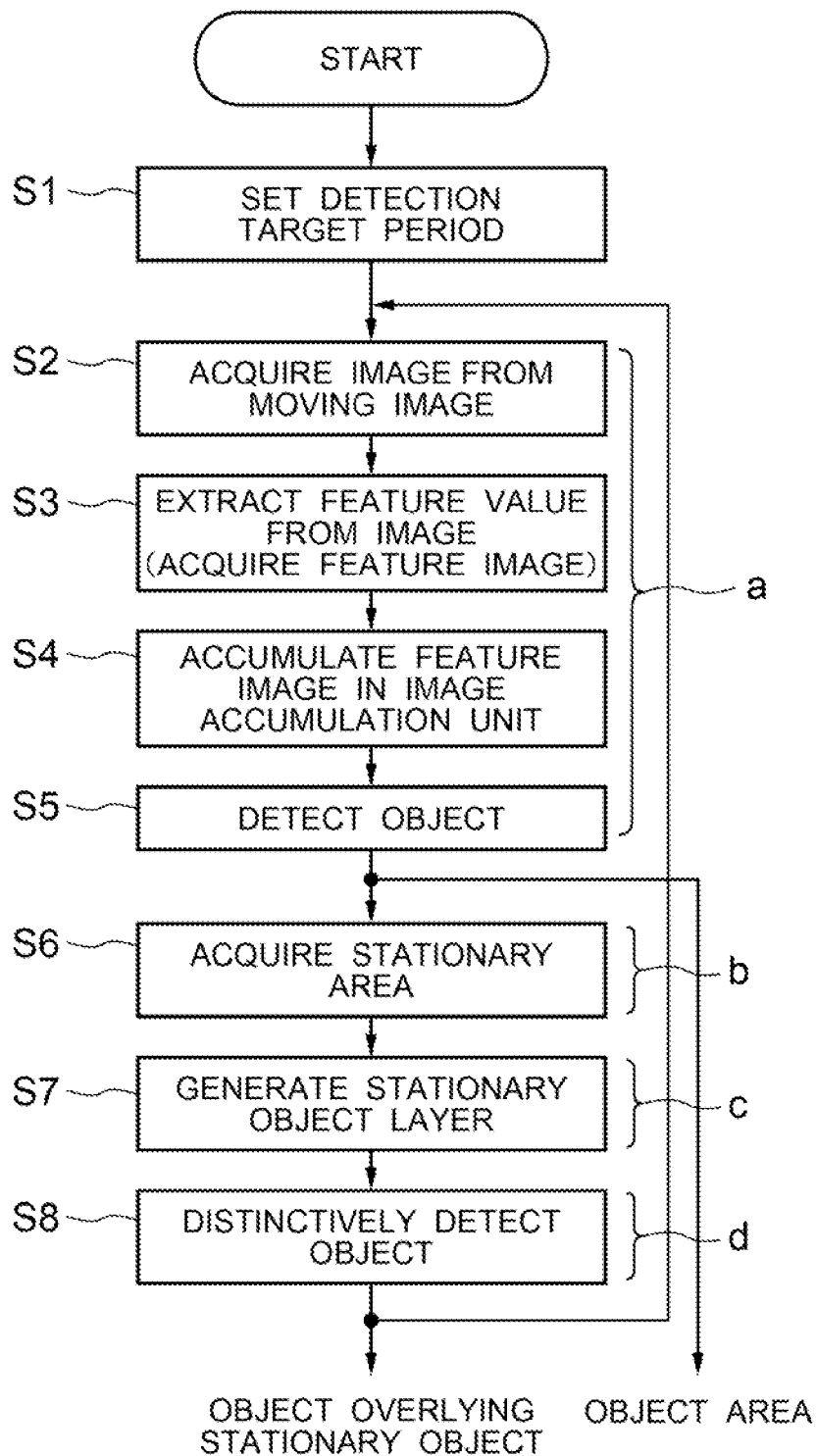
FIG. 8 is a flowchart showing the overall operation in the exemplary embodiment of FIG. 1.
Figure 9:
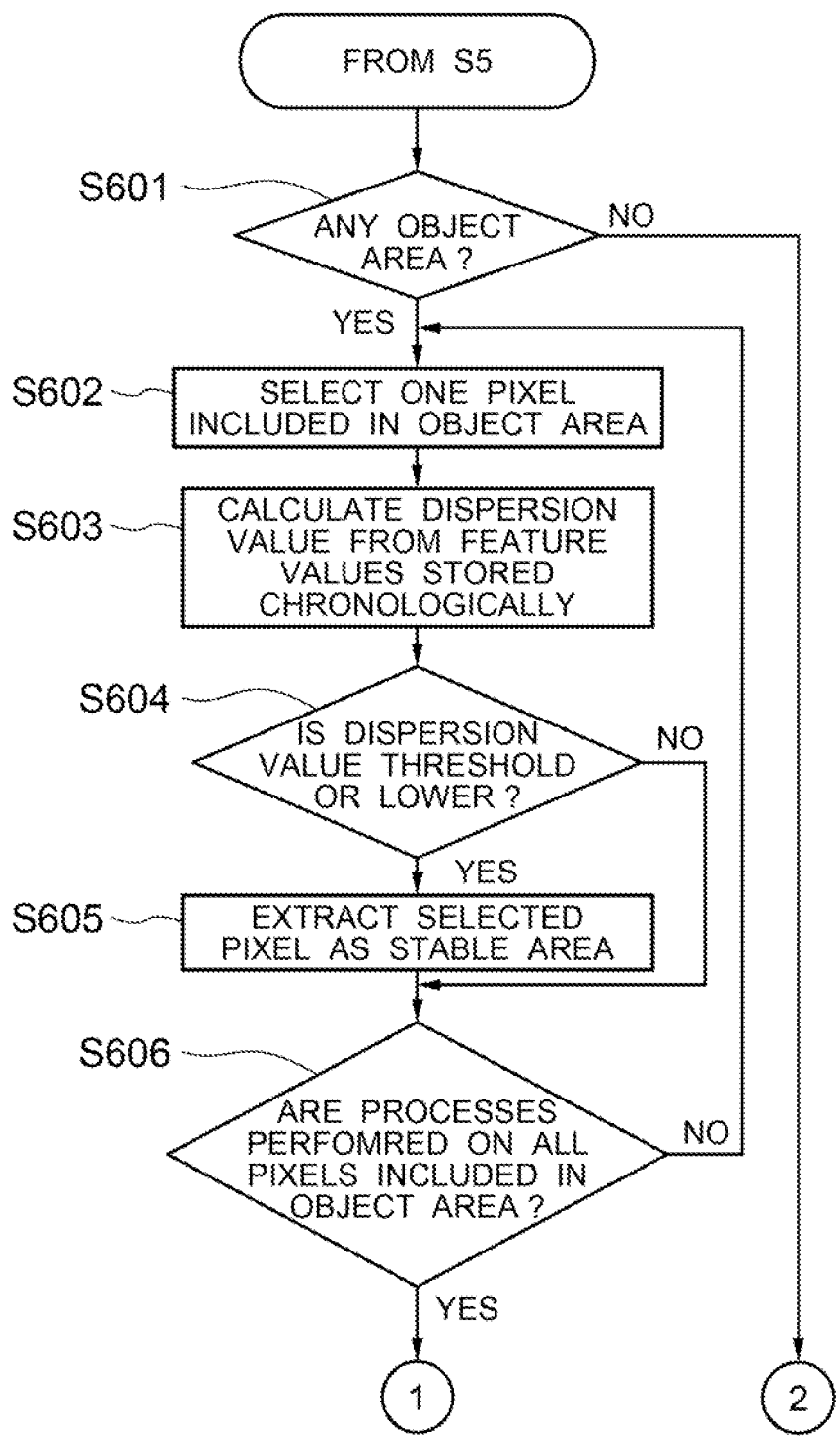
FIG. 9 is a flowchart showing detailed operation (Part 1) at step S6 in FIG. 8.
Figure 10:
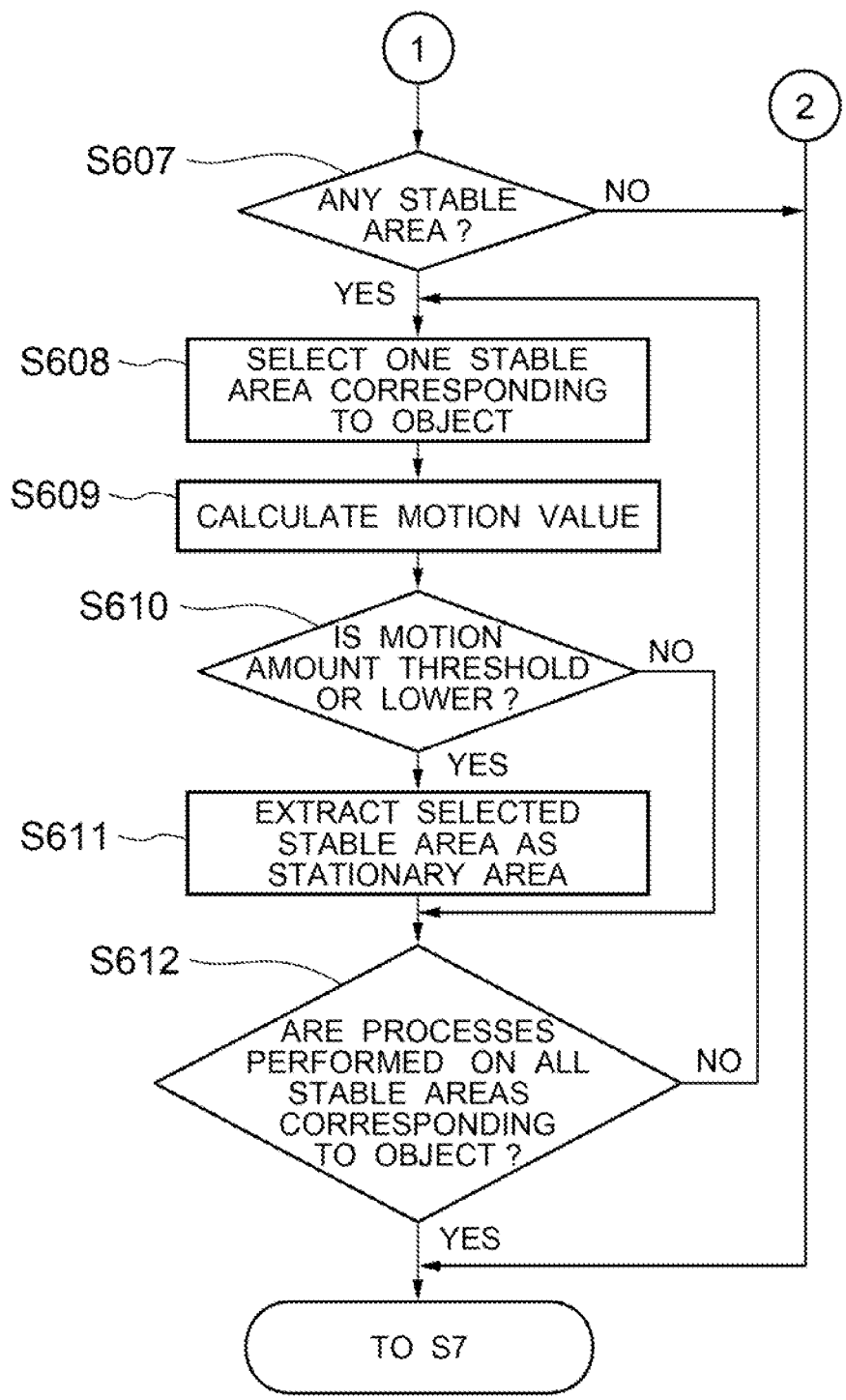
FIG. 10 is a flowchart showing detailed operation (Part 2) at step S6 in FIG. 8.
Figure 11:
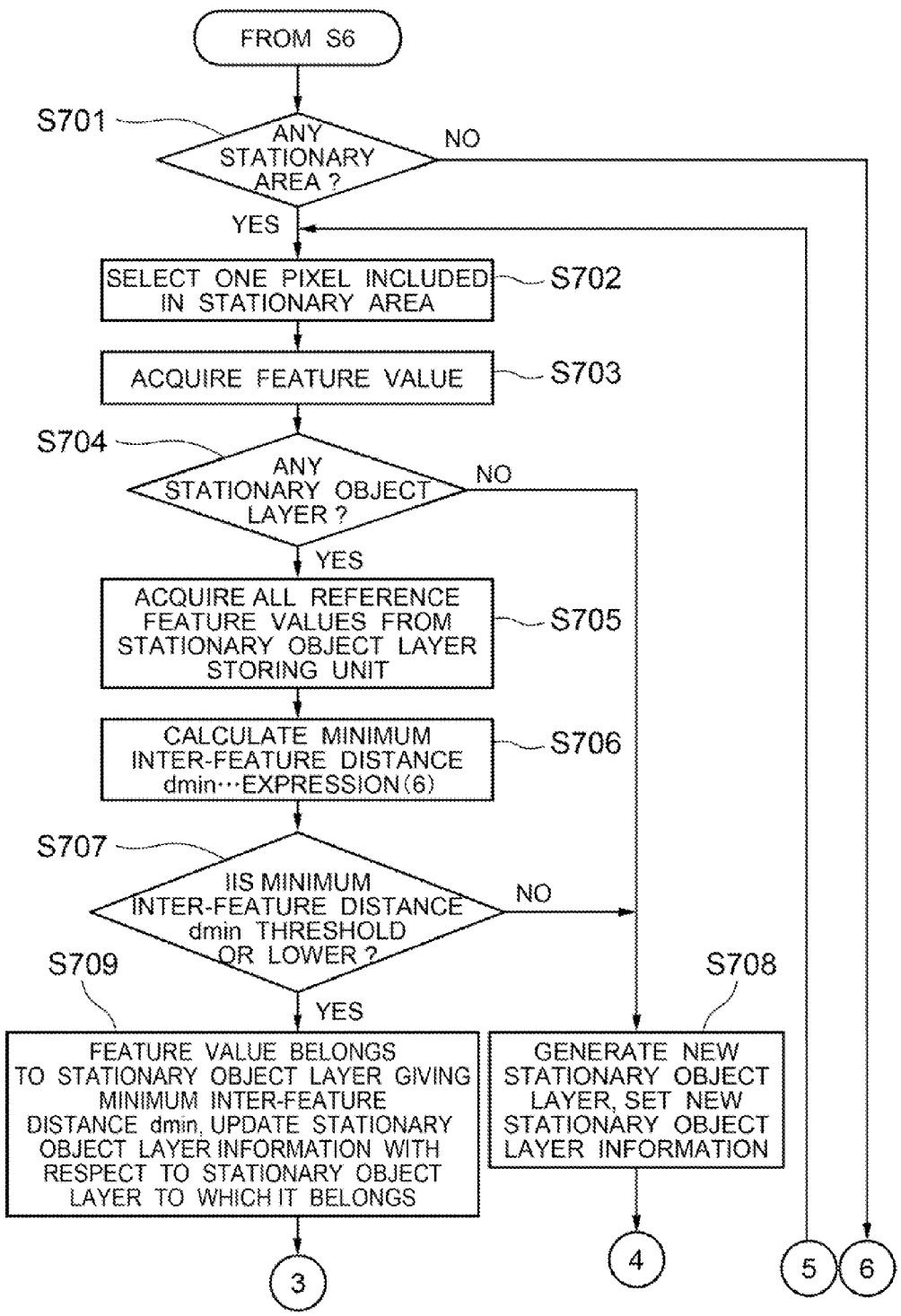
FIG. 11 is a flowchart showing detailed operation (Part 1) at step S7 in FIG. 8.
Figure 12:
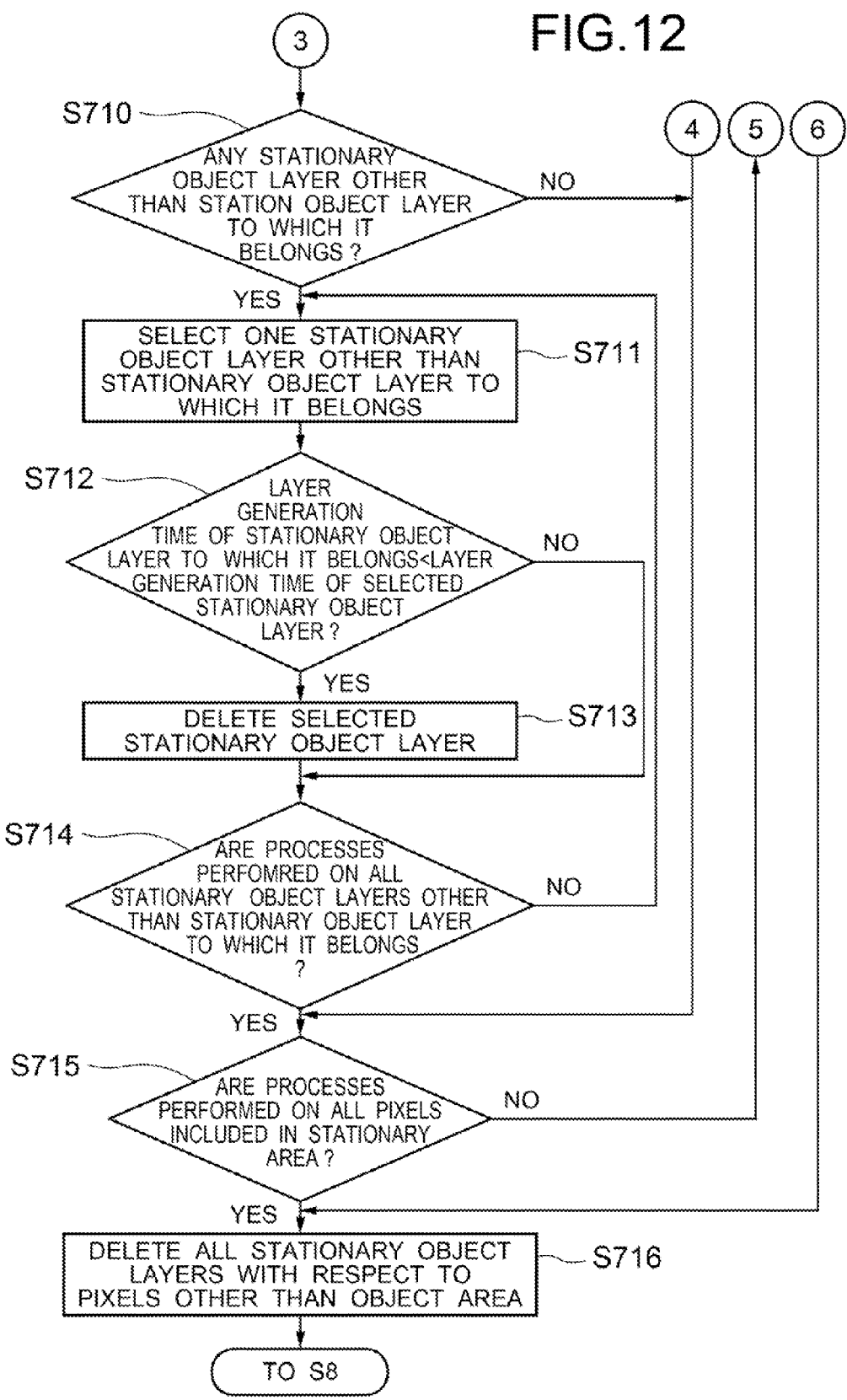
FIG. 12 is a flowchart showing detailed operation (Part 2) at step S7 in FIG. 8.
Figure 13:
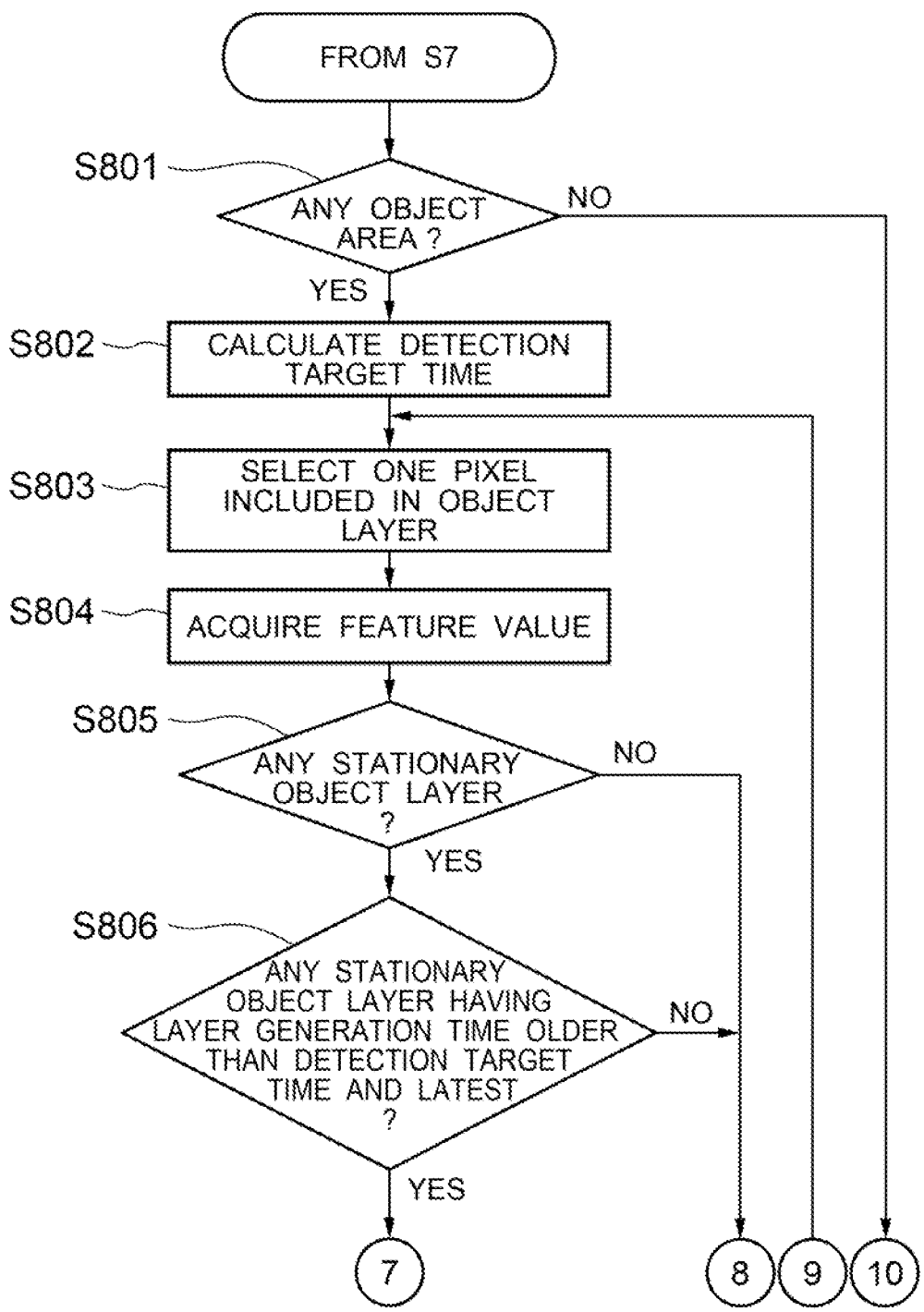
FIG. 13 is a flowchart showing detailed operation (Part 1) at step S8 in FIG. 8.
Figure 14:
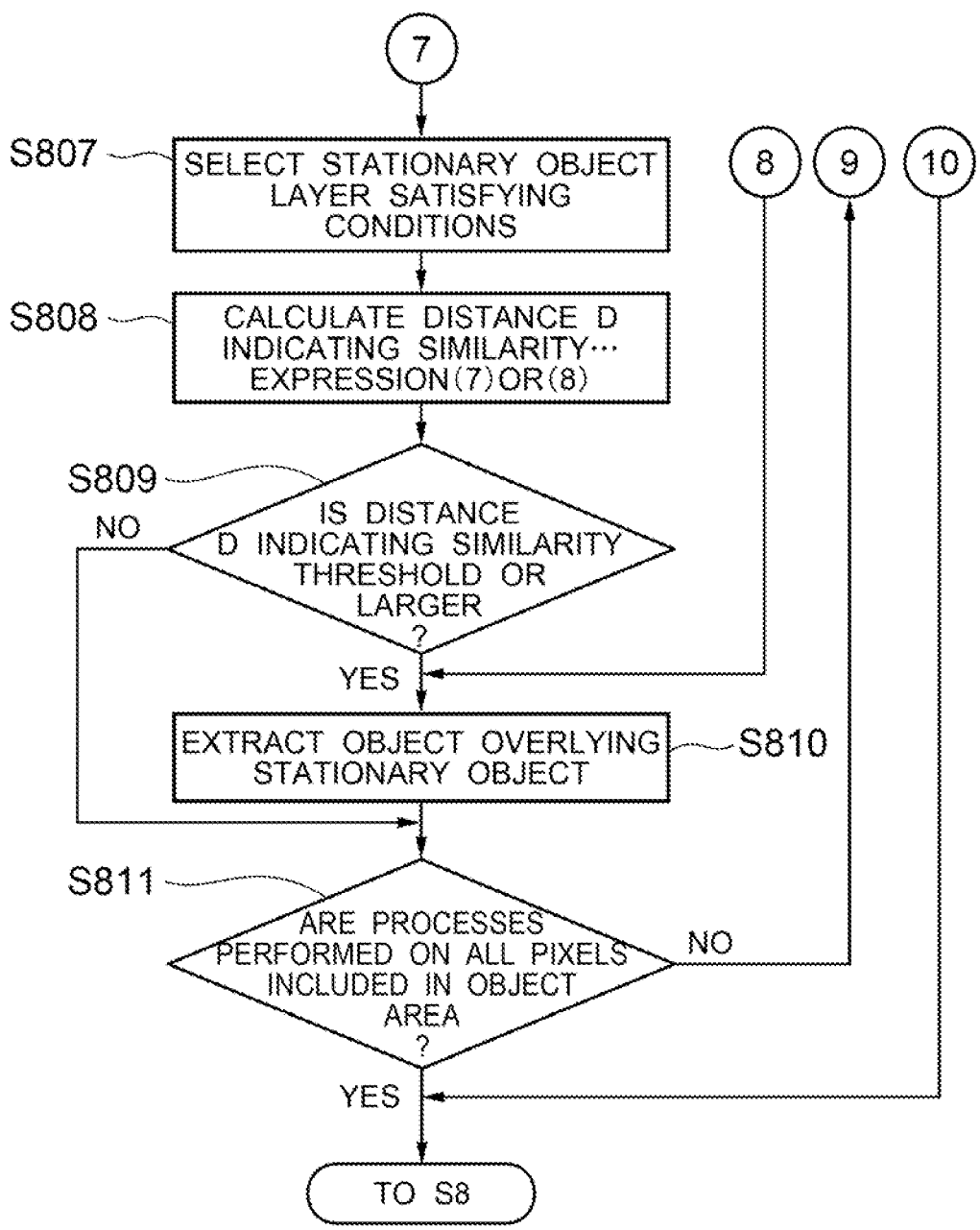
FIG. 14 is a flowchart showing detailed operation (Part 2) at step S8 in FIG. 8.
Figure 15:
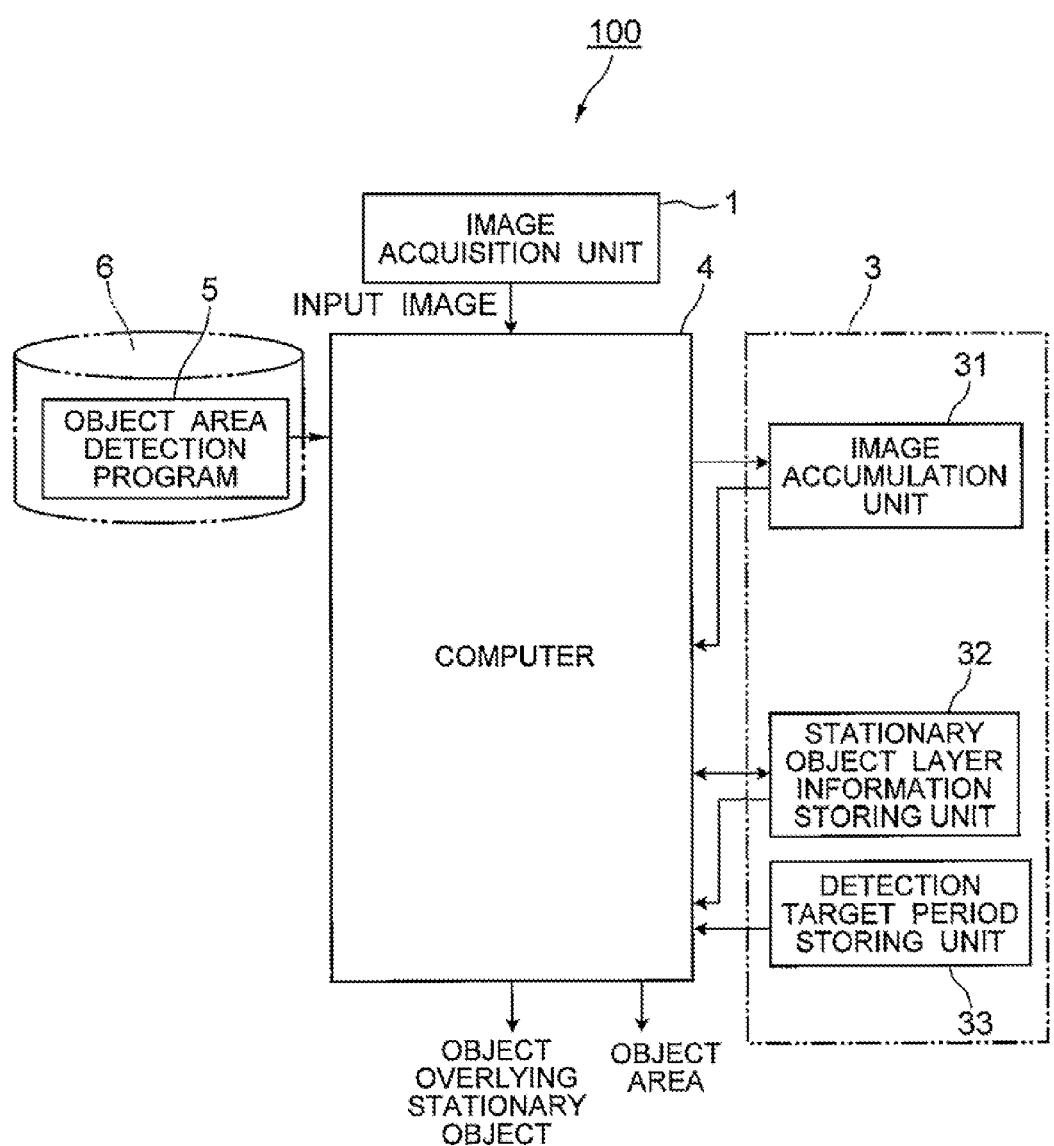
FIG. 15 is a block diagram showing an example in which the exemplary embodiment of FIG. 1 is further embodied.

1 Image acquisition unit
2 Data processing device (Object area detection device)
3 Storage device
4 Computer
5 Object area detection program
6 Computer readable storage medium
21 Feature extraction unit
22 Object detection unit
23 Stationary area acquisition unit
24 Stationary object layer generation unit
25 Object separative detection unit
31 Image accumulation unit
32 Stationary object layer information storing unit
33 Detection target period storing unit
100 Object area detection system
101 First unit
102 Second unit
103 Third unit
104 Fourth unit

What is claimed is:

1. An object area detection device comprising:
a first unit which detects an object area using an input image and background information not including an object;
a second unit which, with respect to an area where a temporal change in the object area is small, detects an area (mass) having small spatial motion in a mass in an object unit within the area as a stationary area;
a third unit which accumulates information of the stationary area as a plurality of pieces of background information arranged by time; and
a fourth unit which compares the plurality of pieces of background information arranged by time with the object area and detects each object included in the object area.

2. An object area detection device comprising:
a first unit which detects an object area using an input image and background information not including an object;
a second unit which, with respect to an area where a temporal change in the object area is small, detects an area (mass) having small spatial motion in a mass in an object unit within the area as a stationary area;
a third unit which accumulates information of the stationary area as time-series background information;
a fourth unit which compares the time-series background information with the object area and detects each object included in the object area;
a feature extraction unit and an object detection unit as the first unit;
a stationary area acquisition unit as the second unit;

a stationary object layer generation unit as the third unit; and an object separative detection unit as the fourth unit, wherein the feature extraction unit has a function of extracting a feature value of each pixel in the input image and outputting the input image as a feature image;

the object detection unit has a function of detecting an object area where the object exists from the feature image, using the background information not including an object;

the stationary area acquisition unit has a function of, with respect to an area where a temporal change in the object area is small, detects an area (mass) having small spatial motion in a mass in an object unit within the area as a stationary area;

the stationary object layer generation unit has a function of generating a stationary object layer and stationary object layer information thereof, based on the feature value of each pixel of the stationary area; and the object separative detection unit has a function of comparing the feature value of each pixel in the object area with existing stationary object layer information and detecting an object overlying a stationary object.

3. The object area detection device according to claim 2, wherein the stationary area acquisition unit obtains a dispersion value from time-series of the feature value of each pixel in the object area, extracts each pixel having a certain dispersion value or smaller as a stable area where a temporal change is small and stable, obtains, with respect to the stable area, an amount of motion indicating spatial motion in each mass in an object unit within the area, and acquires the stable area having a certain amount of motion or smaller as the stationary area.

4. The object area detection device according to claim 3, wherein the stationary area acquisition unit obtains an optical flow by template matching with respect to each pixel in the stable area in the object unit, and calculates the amount of motion by a weighted average obtained by weighting the size of the optical flow with a matching distance or a weighted average obtained by largely weighting the size of the optical flow near a contour of the object area.

5. The object area detection device according to claim 2, wherein the stationary object layer generation unit compares the feature value of each pixel in the stationary area with a reference feature value of the existing stationary object layer, and if there is a stationary object layer having an inter-feature distance which is closest and is a certain value or smaller, determines that the feature value of the stationary area belongs to the stationary object layer and updates the stationary object layer information, and deletes a stationary object layer having a layer generation time which is later than a layer generation time of the stationary object layer to which the feature value of the stationary area belongs, and if there is no stationary object layer to which the feature value of the stationary area belongs or if there is no existing stationary object layer at all, generates a previously presented stationary object layer, sets stationary object layer information thereof, and with respect to pixels other than those in the object area, deletes all stationary object layers.

6. The object area detection device according to claim 2, wherein when comparing the feature value of each pixel in the object area with the existing stationary object layer information, the object separative detection unit calculates a detection target time by subtracting a stored detection target period from a current time, and selects, for comparison, one stationary object layer having a layer generation time which is older than the detection target time and the latest.

7. The object area detection device according to claim 6, wherein if there is no stationary object layer having the layer generation time which is older than the detection target time and the latest, or if there is no stationary object layer at all, the object separative detection unit detects each pixel in the object area as the object overlying the stationary object.

8. The object area detection device, according to claim 2, wherein the object separative detection unit uses an average value and a dispersion value obtained by referring to the feature value of each pixel in the object area and the selected stationary object layer information to set an absolute value of a different amount between the feature value and the average value or a value obtained by normalizing the absolute value with a standard deviation, to be a distance indicating similarity, and detects each pixel having a distance indicating similarity of a certain value or larger as the object overlying the stationary object.

9. An object area detection system comprising:

the object area detection device according to claim 2;

an image acquisition unit which acquires an input image from a moving image and outputs the input image to the object area detection device; and a storage device which stores information including the feature value and the stationary object layer information.

10. An object area detection method comprising:

a step "a" of detecting an object area using an input image and background information not including an object;

a step "b" of, with respect to an area where a temporal change in the object area is small, detecting an area (mass) having small spatial motion in a mass in an object unit within the area as a stationary area;

a step "c" of accumulating information of the stationary area as a plurality of pieces of background information arranged by time; and a step "d" of comparing the plurality of pieces of background information arranged by time with the object area and detecting each object included in the object area.

11. An object area detection method comprising:

a step "a" of detecting an object area using an input image and background information not including an object;

a step "b" of, with respect to an area where a temporal change in the object area is small, detecting an area (mass) having small spatial motion in a mass in an object unit within the area as a stationary area;

a step "c" of accumulating information of the stationary area as time-series background information;

a step "d" of comparing the time-series background information with the object area and detecting each object included in the object area;

a first step and a second step as the step "a";

a third step as the step "b";

a fourth step as the step "c"; and a fifth step as the step "d", wherein in the first step, a feature value is extracted for each pixel in the input image and the input image is output as a feature image, in the second step, an object area where the object exists is detected from the feature image using the background information not including an object, in the third step, with respect to an area where a temporal change in the object area is small, an area (mass) having small spatial motion in a mass in an object unit within the area is acquired as a stationary area, in the fourth step, a stationary object layer and stationary object layer information thereof are generated, based on the feature value of each pixel in the stationary area, and in the fifth step, the feature value of each pixel in the object area and the existing stationary object layer information are compared, and an object overlying a stationary object is detected.

12. The object area detection method according to claim 11, wherein in the third step, a dispersion value is obtained from time-series of the feature value of each pixel in the object area, each pixel having a certain dispersion value or smaller is extracted as a stable area in which a temporal change is small and stable, with respect to the stable area, an amount of motion indicating spatial motion in each mass in an object unit within the area is calculated, and the stable area having a certain amount of motion or less is acquired as the stationary area.

13. The object area detection method according to claim 12, wherein in the third step, an optical flow is obtained by template matching with respect to each pixel in the stable area in an object unit, and the amount of motion is calculated by a weighted average obtained by weighting the size of the optical flow with a matching distance or a weighted average obtained by largely weighting the size of the optical flow near a contour of the object area.

14. The object area detection method according to claim 11, wherein in the fourth step, the feature value of each pixel in the stationary area is compared with a reference feature value of an existing stationary object layer, and if there is a stationary object layer having an inter-feature distance which is the closest and is a certain value or smaller, it is determined that the feature value of the stationary area belongs to the stationary object layer and the stationary object layer information is updated, and a stationary object layer having a layer generation time which is later than a layer generation time of the stationary object layer to which the feature value of the stationary area belongs is deleted, and if there is no stationary object layer to which the feature value of the stationary area belongs or there is no existing stationary object layer at all, a previously presented stationary object layer is generated and stationary object layer information thereof is set, and with respect to pixels other than those in the object area, all stationary object layers are deleted.

15. The object area detection method according to claim 11, wherein in the fifth step, when the feature value of each pixel in the object area is compared with existing stationary object layer information, a detection target time is calculated by subtracting a stored detection target period from a current time, and one stationary object layer having a layer generation time which is older than the detection target time and is the latest is selected for comparison.

16. The object area detection method according to claim 15, wherein in the fifth step, if there is no stationary object layer having a layer generation time which is older than the detection target time and is the latest, or if there is no stationary layer object at all, each pixel in the object area is detected as the object overlying the stationary object.

17. The object area detection method according to claim 11, wherein in the fifth step, with use of an average value and a dispersion value obtained by referring to the feature value of each pixel in the object area and the selected stationary object layer information, an absolute value of a difference amount between the feature value and the average value or a value obtained by normalizing the absolute value with a standard deviation is set as a distance indicating similarity, and each pixel having a distance indicating similarity of a certain value or larger is detected as the object overlying the stationary object.

18. A non-transitory computer readable recording medium storing an object area detection program for causing a computer to perform:

a function of detecting an object area using an input image and background information not including an object;

a function of, with respect to an area where a temporal change in the object area is small, detecting an area (mass) having small spatial motion in a mass in an object unit within the area as a stationary area;

a function of accumulating information of the stationary area as a plurality of pieces of background information arranged by time; and a function of comparing the plurality of pieces of background information arranged by time with the object area, and detecting each object included in the object area.

19. A non-transitory computer readable recording medium storing an object area detection program for causing a computer to perform:

a function of detecting an object area using an input image and background information not including an object;

a function of, with respect to an area where a temporal change in the object area is small, detecting an area (mass) having small spatial motion in a mass in an object unit within the area as a stationary area;

a function of accumulating information of the stationary area as time-series background information;

a function of comparing the time-series background information with the object area, and detecting each object included in the object area;

a function of extracting a feature value for each pixel in the input image and outputting the input image as a feature image;

a function of detecting an object area where the object exists from the feature image, using the background information not including an object;

a function of, with respect to an area where a temporal change in the object area is small, acquiring an area (mass) having small spatial motion in a mass in an object unit within the area as a stationary area;

a function of generating a stationary object layer and stationary object layer information thereof based on the feature value of each pixel in the stationary area; and a function of comparing the feature value of each pixel in the object area with existing stationary object layer information, and detecting an object overlying a stationary object.

20. The computer readable recording medium storing the object area detection program according to claim 19, further causing the computer to perform a function of obtaining a dispersion value from time-series of the feature value of each pixel in the object area, extracting each pixel having a certain dispersion value or smaller as a stable area where a temporal change is small and stable, obtaining, with respect to the stable area, an amount of motion indicating spatial motion in each mass in an object unit within the area, and acquiring the stable area having an certain amount of motion or smaller as the stationary area.

21. The computer readable recording medium storing the object area detection program according to claim 20, further causing the computer to perform a function of calculating an optical flow by template matching with respect to each pixel in the stable area in an object unit, and calculating the amount of motion by a weighted average obtained by weighting the size of the optical flow with a matching distance or a weighted average obtained by largely weighting the size of the optical flow near a contour of the object area.

22. The computer readable recording medium storing the object area detection program according to claim 19, further causing the computer to perform a function of comparing the feature value of each pixel in the stationary area with a reference feature value of the existing stationary object layer, and if there is a stationary object layer having an inter-feature distance which is the closest and has a certain value or smaller, determining that the feature value of the stationary area belongs to the stationary object layer and updating the stationary object layer information, and deleting a stationary object layer having a layer generation time which is later than a layer generation time of the stationary object layer to which the feature value of the stationary area belongs, and if there is no stationary object layer to which the feature value of the stationary area belongs or if there is no existing stationary object layer at all, generating a previously presented stationary object layer, setting stationary object layer information thereof, and with respect to pixels other than those in the object area, deleting all stationary object layers.

23. The computer readable recording medium storing the object area detection program according to claim 19, further causing the computer to perform a function of, when comparing the feature value of each pixel in the object area with the existing stationary object layer information, calculating a detection target time by subtracting a stored detection target period from a current time, and selecting, for comparison, one stationary object layer having a layer generation time which is older than the detection target time and the latest.

24. The computer readable recording medium storing the object area detection program according to claim 23, further causing the computer to perform a function of, if there is no stationary object layer having the layer generation time which is older than the detection target time and the latest, or if there is no stationary object layer at all, detecting each pixel in the object area as the object overlying the stationary object.

25. The computer readable recording medium storing the object area detection program according to claim 19, further causing the computer to perform a function of, with use of an average value and a dispersion value obtained by referring to the feature value of each pixel in the object area and the selected stationary object layer information, setting an absolute value of a different amount between the feature value and the average value or a value obtained by normalizing the absolute value with a standard deviation, to be a distance indicating similarity, and detecting each pixel having a distance indicating similarity of a certain value or larger as the object overlying the stationary object.

26. An object area detection device comprising:
first means for detecting an object area using an input image and background information not including an object;
second means for, with respect to an area where a temporal change in the object area is small, detecting an area (mass) having small spatial motion in a mass in an object unit within the area as a stationary area;
third means for accumulating information of the stationary area as a plurality of pieces background information arranged by time; and
fourth means for comparing the plurality of pieces of background information arranged by time with the object area and detecting each object included in the object area.

* * * * *